(12) United States Patent
Panda et al.

(10) Patent No.: US 12,548,333 B2
(45) Date of Patent: Feb. 10, 2026

(54) DYNAMIC NETWORK QUANTIZATION FOR EFFICIENT VIDEO INFERENCE

(71) Applicants: International Business Machines Corporation, Armonk, NY (US); TRUSTEES OF BOSTON UNIVERSITY, Boston, MA (US)

(72) Inventors: Rameswar Panda, Medford, MA (US); Ximeng Sun, Brookline, MA (US); Richard Chen, Baldwin Place, NY (US); Rogerio Schmidt Feris, West Hartford, CT (US); Ekaterina Saenko, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 17/566,782

(22) Filed: Dec. 31, 2021

(65) Prior Publication Data

US 2023/0215174 A1 Jul. 6, 2023

(51) Int. Cl.
*G06V 10/82* (2022.01)
*G06N 3/084* (2023.01)
*G06V 20/40* (2022.01)

(52) U.S. Cl.
CPC ............. *G06V 20/46* (2022.01); *G06N 3/084* (2013.01); *G06V 10/82* (2022.01); *G06V 20/41* (2022.01)

(58) Field of Classification Search
CPC ........ G06V 20/46; G06V 10/82; G06V 20/41; G06V 20/42; G06N 3/084; G06N 3/044; G06N 3/045; G06N 3/08; G06N 3/082

USPC .......................................................... 382/159
See application file for complete search history.

(56) References Cited

U.S. PATENT DOCUMENTS

| 7,110,047 | B2 | 9/2006 | McGee |
| 10,169,661 | B2 | 1/2019 | Bobbitt |
| 2021/0319232 | A1* | 10/2021 | Perazzi ............... G06N 3/08 |
| 2022/0164666 | A1* | 5/2022 | Liu ................... G06N 3/082 |

(Continued)

FOREIGN PATENT DOCUMENTS

| CN | 108062531 A | 5/2018 |
| CN | 111667422 A | 9/2020 |

(Continued)

OTHER PUBLICATIONS

Meng et al. (AR-Net: Adaptive Frame Resolution for Efficient Action Recognition, published Jul. 2020, pp. 1-25) (Year: 2020).*

(Continued)

*Primary Examiner* — Mohammed H Zuberi
*Assistant Examiner* — Ahamed I Nazar
(74) *Attorney, Agent, or Firm* — Caleb Wilkes; Otterstedt & Kammer PLLC

(57) ABSTRACT

A recognition network is trained for a selected video frame at a desired highest precision using back-propagation and a policy network is trained using back-propagation from the trained recognition network. The recognition network is trained at a lower precision specified by a policy recommended for the selected video frame by the trained policy network. A frame of a given video is inputted to the trained policy network for determination of a precision policy for processing the frame. Video inferencing is performed utilizing the trained policy network and the trained recognition network based on the precision policy.

20 Claims, 16 Drawing Sheets

(56) References Cited

U.S. PATENT DOCUMENTS

| | | | |
|---|---|---|---|
| 2022/0222532 A1* | 7/2022 | Shu | G06N 3/045 |
| 2022/0284240 A1* | 9/2022 | Bulat | G06F 18/2413 |

FOREIGN PATENT DOCUMENTS

| | | | |
|---|---|---|---|
| CN | 111797805 A | 10/2020 | |
| CN | 111832379 A | 10/2020 | |
| CN | 112446358 A | 3/2021 | |
| CN | 112507913 A | 3/2021 | |
| WO | 20182159071 W | 11/2018 | |

OTHER PUBLICATIONS

Fu et al. (Role-Wise Data Augmentation for Knowledge Distillation, published Apr. 2020, pp. 1-16) (Year: 2020).*

Jin et al. (AdaBits: Neural Network Quantization with Adaptive Bit-Widths, published 2020, pp. 1-11) (Year: 2020).*

Wan et al. (Deep quantization generative networks, published 2020, pp. 1-12) (Year: 2020).*

Sun et al. (AdaShare: Learning What to Share for Efficient Deep Multi-Task Learning, published Nov. 2020, pp. 1-19) (Year: 2020).*

Meng et al. (AR-Net: Adaptive Frame Resolution for Efficient Action Recognition, published Jul. 31, 2020, pp. 1-25) (Year: 2020).*

Sun et al. (AdaShare: Learning What To Share For Efficient Deep Multi-Task Learning, published Nov. 18, 2020, pp. 1-13) (Year: 2020).*

Sun et al (AdaShare: Learning What to Share for Efficient Deep Multi-Task Learning, pp. 1-13) (Year: 2020).*

Meng et al. (AR-Net: Adaptive Frame Resolution for Efficient Action Recognition, pp. 1-25) (Year: 2020).*

Kimeng Sun, Rameswar Panda, Chun-Fu (Richard) Chen, Aude Oliva, Rogerio Feris, and Kate (Ekaterina) Saenko, Dynamic Network Quantization for Efficient Video Inference, In Proceedings of the IEEE/CVF International Conference on Computer Vision 2021 (pp. 7375-7385) made available arXiv:2108.10394v1 [cs.CV] Aug. 23, 2021. (Grace Period Disclosure).

Christoph Feichtenhofer. X3d: Expanding architectures for efficient video recognition. arXiv preprint arXiv:2004.04730v1,2020. (14 pages.) Apr. 9, 2020.

AJ Piergiovanni, Anelia Angelova, and Michael S Ryoo. Tiny video networks.arXiv preprint arXiv:1910.06961v3, 2019. (11 pages.) Jun. 30, 2021.

Wenhao Wu, Dongliang He, Xiao Tan, Shifeng Chen, and Shilei Wen. Multi-agent reinforcement learning based frame sampling for effective untrimmed video recognition. In Proceedings of the IEEE International Conference on Computervision, pp. 6222-6231, 2019.

Zuxuan Wu, Cai ming Xiong, Chih-Yao Ma, Richard Socher, and Larry S Davis. Adaframe: Adaptive frame selection forfast video recognition. In Proceedings of the IEEE Conference on Computer Vision and Pattern Recognition, pp. 1278-1287, 2019.

Jungwook Choi, Zhuo Wang, Swagath Venkataramani, Pierce I-Jen Chuang, Vijayalakshmi Srinivasan, and Kailash Gopalakrishnan. Pact: Parameterized clipping activation for quantized neural networks. arXiv preprint arXiv:1805.06085v2, 2018. (15 pages.) Jul. 17, 2018.

Shuchang Zhou, Yuxin Wu, Zekun Ni, Xinyu Zhou, He Wen, and Yuheng Zou. Dorefa-net: Training low bitwidth convolutional neural networks with low bitwidth gradients. arXivpreprint arXiv:1606.06160v3, 2018. (13 pages.) Feb. 2, 2018.

Peter Mell and Timothy Grance, The NIST Definition of Cloud Computing, NIST Special Publication 800-145, Sep. 2011, cover, pp. i-iii and 1-3.

Andrej Karpathy, George Toderici, Sanketh Shetty, Thomas Leung, Rahul Sukthankar, and Li Fei-Fei. Large-scale video convolutional neural networks. In European conference on computer vision, pp. 525-542. Springer, 2016.

Du Tran, Lubomir Bourdev, Rob Fergus, Lorenzo Torresani, and Manohar Paluri. Learning spatiotemporal features with 3d convolutional networks. In Proceedings of the IEEE international conference on computer vision, pp. 4489-4497, 2015.

AJ Piergiovanni, Anelia Angelova, and Michael S Ryoo. Tiny video networks. arXiv preprint arXiv:1910.06961, 2019. Jun. 30, 2021 11 pages.

Christoph Feichtenhofer, Haoqi Fan, Jitendra Malik, and Kaiming He. Slowfast networks for video recognition. In Proceedings of the IEEE International Conference on Computer Vision, pp. 6202-6211, Oct. 29, 2019.

Lirnin Wang, Yuanjun Xiong, Zhe Wang, Yu Qiao, Dahua Lin, Xiaoou Tang, and Luc Van Goo!. Temporal segment networks: Towards good practices for deep action recognition. In European conference on computer vision, pp. 20-36. Springer, 2016. Aug. 2, 2016.

Song Han, Huizi Mao, and William J Dally. Deep compression: Compressing deep neural networks with pruning, trained quantization and huffman coding. arXiv preprint arXiv:1510.00149, 2015. Feb. 15, 2017 14 pages.

Christoph Feichtenhofer. X3d: Expanding architectures for efficient video recognition. arXiv preprint arXiv:2004.04730, 2020. Apr. 9, 2020 14 pages.

Emmanuel Bengio, Pierre-Luc Bacon, Joelle Pineau, and Doina Precup. Conditional computation in neural networks for faster models. arXiv preprint arXiv:1511.06297, 2015. 12 pages Jan. 7, 2016.

Michael Figurnov, Maxwell D Collins, Yukun Zhu, Li Zhang, Jonathan Huang, Dmitry Vetrov, and Ruslan Salakhutdinov. Spatially adaptive computation time for residual networks. In Proceedings of the IEEE Conference on Computer Vision and Pattern Recognition, pp. 1039-1048, 2017. Jul. 2, 2017.

Jiahui Yu, Linjie Yang, Ning Xu, Jianchao Yang, and Thomas Huang. Slimmable neural networks. arXiv preprint arXiv:1812.08928, 2018. 12 pages Dec. 21, 2018.

Zequn Jie, Peng Sun, Xin Li, Jiashi Feng, and Wei Liu. Any.time recognition with routing convolutional networks. IEEE transactions on pattern analysis and machine intelligence, 2019. abstract only 4 pages Dec. 18, 2019.

Le Yang, Yizeng Han, Xi Chen, Shiji Song, Jifeng Dai, and Gao Huang. Resolution adaptive networks for efficient in. ference. In Proceedings of the IEEE/CVF Conference on Computer Vision and Pattern Recognition, pp. 2369-2378, 2020. May 18, 2020.

Serena Yeung, Olga Russakovsky, Greg Mori, and Li Fei•Fei. End-to-end learning of action detection from frame glimpses in videos. In Proceedings of the IEEE Conference on Computer Vision and Pattern Recognition, pp. 2678-2687, 2016. Mar. 13, 2017.

Gao, Ruohan and Oh, Tae-Hyun, and Grauman, Kristen and Torresani, Lorenzo. Listen to look: Action recognition by previewing audio. In Proceedings of the IEEE Conference on Computer Vision and Pattern Recognition (CVPR), 2020. Mar. 28, 2020 11 pages.

Bowen Pan, Rameswar Panda, Camilo Luciano Fosco, Chung•Ching Lin, Alex J Andonian, Yue Meng, Kate Saenko, Aude Oliva, and Rogerio Feris. Va-red2 : Video adaptive redun•dancy reduction. In International Conference on Learning Representations, 2021. 19 pages Oct. 5, 2021.

Zuxuan Wu, Caiming Xiong, Yu-Gang Jiang, and Larry S Davis. Liteeval: A coarse-to-fine framework for resource eff••cient video recognition. In Advances in Neural Information Processing Systems, pp. 7778-7787, 2019. Dec. 3, 2019.

Yue Meng, Rameswar Panda, Chung-Ching Lin, Prasanna Sattigeri, Leonid Karlinsky, Kate Saenko, Aude Oliva, and Rogerio Feris. Adafuse: Adaptive temporal fusion network for efficient action recognition. In International Conference on Learning Representations, 2021. 15 pages Feb. 10, 2021.

Zuxuan Wu, Caiming Xiong, Chih-Yao Ma, Richard Socher, and Larry S Davis. Adaframe: Adaptive frame selection for fast video recognition. In Proceedings of the IEEE Conference on Computer Vision and Pattern Recognition, pp. 1278-1287, 2019. Apr. 10, 2019.

Song Han, Huizi Mao, and William J Dally. Deep co••pression: Compressing deep neural networks with pruning, trained quantization and huffman coding. arXiv preprint arXiv:1510.00149, 2015. 14 pages Feb. 15, 2016.

(56) References Cited

OTHER PUBLICATIONS

Dongqing Zhang, Jiaolong Yang, Dongqiangzi Ye, and Gang Hua. Lq-nets: Learned quantization for highly accurate and compact deep neural networks. In Proceedings of the European conference on computer vision (ECCV), pp. 365-382, 2018. Jul. 26, 2018.

Kuan Wang, Zhijian Liu, Yujun Lin, Ji Lin, and Song Han. Haq: Hardware-aware automated quantization with mixed precision. In Proceedings of the IEEE conference on computer vision and pattern recognition, pp. 8612-8620, 2019. Apr. 6, 2019.

Itay Hubara, Matthieu Courbariaux, Daniel Soudry, Ran El-Yaniv, and Yoshua Bengio. Binarized neural networks. In Advances in neural information processing systems, pp. 4107-4115, 2016. Mar. 17, 2016.

Bohan Zhuang, Chunhua Shen, Mingkui Tan, Lingqiao Liu, and Ian Reid. Towards effective low-bitwidth convolutional neural networks. In Proceedings of the IEEE conference on computer vision and pattern recognition, pp. 7920-7928, 2018. Nov. 17, 2017.

Qing Jin, Linjie Yang, and Zhenyu Liao. Adabits: Neural network quantization with adaptive bit-widths. In Proceedings of the IEEE/CVF Conference on Computer Vision and Pattern Recognition, pp. 2146-2156, 2020. Mar. 15, 2020.

McGill M, Perona P. Deciding how to decide: Dynamic routing in artificial neural networks. InInternational Conference on Machine Learning Jul. 17, 2017 (pp. 2363-2372). PMLR.

\* cited by examiner

| Model | First Dataset | | | Second Dataset | | | Mem. (MB) |
|---|---|---|---|---|---|---|---|
| | mAP (%) | GFLOPs | | mAP (%) | GFLOPs | | |
| | ResNet-18 | | | | | | |
| Uniform (32-Bit) | 69.7 | 29.1 | | 77.6 | 29.1 | | 43.1 |
| Uniform (4-Bit) | 68.0 | 7.3 | | 76.5 | 7.3 | | 5.4 |
| Uniform (2-Bit) | 65.2 | 1.8 | | 74.3 | 1.8 | | 2.7 |
| Ensemble | 70.7 | 38.2 | | 78.8 | 38.2 | | 51.2 |
| VideoIQ | 70.9 | 9.5 | | 79.1 | 9.4 | | 50.2 |
| | ResNet-50 | | | | | | |
| Uniform (32-Bit) | 72.5 | 65.8 | | 81.0 | 65.8 | | 91.4 |
| Uniform (4-Bit) | 71.7 | 16.5 | | 79.3 | 16.5 | | 11.4 |
| Uniform (2-Bit) | 69.3 | 4.1 | | 78.5 | 4.1 | | 5.7 |
| Ensemble | 74.7 | 86.4 | | 83.0 | 86.4 | | 108.5 |
| VideoIQ | 74.8 | 28.1 | | 82.7 | 27.0 | | 98.6 |

*FIG. 8*

| Model | First Dataset | | Second Dataset | | Mem. (MB) |
|---|---|---|---|---|---|
| | mAP (%) | GFLOPs | mAP (%) | GFLOPs | |
| Model #1 | 72.7 | 95.1 | 80.0 | 94.3 | 177.2 |
| Model #2 | 72.9 | 42.0 | 81.0 | 42.0 | 98.6 |
| Model #3 | 73.8 | 33.5 | 81.3 | 35.1 | 223.4 |
| Model #4 | 73.1 | 61.4 | 81.6 | 45.0 | 151.2 |
| VideoIQ | 74.8 | 28.1 | 82.7 | 27.0 | 98.6 |

FIG. 9A

| Model | Third Dataset | | Fourth Dataset | | Mem. (MB) |
|---|---|---|---|---|---|
| | mAP (%) | GFLOPs | Tops-1 (%) | GFLOPs | |
| Model #1 | 44.7 | 66.2 | 61.0 | 99.0 | 177.2 |
| Model #2 | 44.3 | 42.0 | 70.8 | 42.0 | 98.6 |
| Model #3 | 45.0 | 37.6 | 71.7 | 32.0 | 223.4 |
| Model #4 | 44.1 | 60.3 | 72.3 | 23.0 | 151.2 |
| VideoIQ | 46.4 | 26.8 | 72.3 | 20.4 | 98.6 |

FIG. 9B

| Test<br>Train | Dataset #1 | Dataset #2 | Dataset #3 | Dataset #4 |
|---|---|---|---|---|
| Dataset #1 | 74.8 | 82.7 | 46.3 | 71.6 |
| Dataset #2 | 74.4 | 82.8 | 45.8 | 72.1 |
| Dataset #3 | 74.6 | 82.6 | 46.4 | 72.2 |
| Dataset #4 | 74.7 | 82.7 | 46.3 | 72.3 |
*FIG. 11*
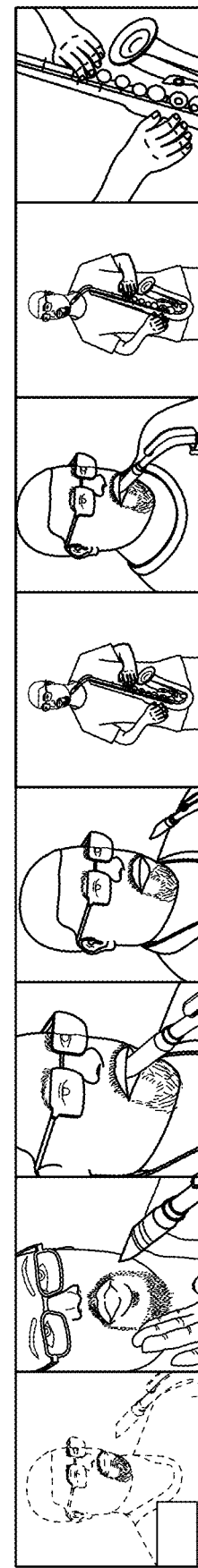
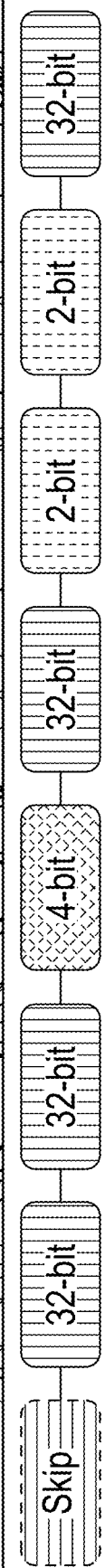
*FIG. 12*

| $L_{ce}$ | $L_{kd}$ | $L_e$ | $L_b$ | $L_d$ | mAP (%) | GFLOPs |
|---|---|---|---|---|---|---|
| ✓ |   | ✓ | ✓ | ✓ | 73.5 | 29.0 |
| ✓ | ✓ |   |   |   | 75.1 | 56.4 |
| ✓ | ✓ | ✓ |   |   | 74.5 | 34.6 |
| ✓ | ✓ | ✓ | ✓ |   | 74.3 | 32.0 |
| ✓ | ✓ | ✓ | ✓ | ✓ | 74.8 | 28.1 |

FIG. 14

| Decision Space $\Omega$ | mAP (%) | GFLOPs |
|---|---|---|
| {32, 0} | 72.9 | 31.6 |
| {32, 4, 2} | 74.5 | 31.4 |
| {32, 4, 0} | 74.7 | 32.8 |
| {32, 2, 0} | 74.0 | 31.2 |
| {32, 4, 2, 0} | 74.8 | 28.1 |

FIG. 15

DYNAMIC NETWORK QUANTIZATION FOR EFFICIENT VIDEO INFERENCE

STATEMENT REGARDING PRIOR DISCLOSURES BY THE INVENTOR OR A JOINT INVENTOR

The following disclosure(s) are submitted under 35 U.S.C. 102(b)(1)(A):

Ximeng Sun, Rameswar Panda, Chun-Fu (Richard) Chen, Aude Oliva, Rogerio Feris, and Kate (Ekaterina) Saenko, DYNAMIC NETWORK QUANTIZATION FOR EFFICIENT VIDEO INFERENCE, In Proceedings of the IEEE/CVF International Conference on Computer Vision 2021 (pp. 7375-7385) made available arXiv:2108.10394v1 [cs.CV] 23 Aug. 2021.

BACKGROUND

The present invention relates to the electrical, electronic and computer arts, and more specifically, to video inference systems.

Classifying videos is a core problem of artificial intelligence (AI), owing to its applications in many areas, such as public safety, security, behavior analysis, and the like. Accuracy obtained by most of the conventional classification methods usually grows proportionally with their complexity and computational cost. This poses an issue for deploying these models in many resource-limited applications, such as autonomous vehicles and mobile platforms. More data and deeper models, however, mean more floating point operations per second (FLOPs) and larger memory systems. Such systems are computation intensive, memory intensive, and difficult to employ on edge devices, mobile devices, and the like.

SUMMARY

Principles of the invention provide techniques for dynamic network quantization for efficient video inference. In one aspect, an exemplary method includes the operations of training a recognition network for a selected video frame at a desired highest precision using back-propagation; training a policy network using back-propagation from the trained recognition network; training the recognition network at a lower precision specified by a policy recommended for the selected video frame by the trained policy network; inputting a frame of a given video to the trained policy network for determination of a precision policy for processing the frame; and performing video inferencing utilizing the trained policy network and the trained recognition network based on the precision policy.

In one aspect, an apparatus comprises a memory and at least one processor, coupled to the memory, and operative to perform operations comprising training a recognition network for a selected video frame at a desired highest precision using back-propagation; training a policy network using back-propagation from the trained recognition network; training the recognition network at a lower precision specified by a policy recommended for the selected video frame by the trained policy network; inputting a frame of a given video to the trained policy network for determination of a precision policy for processing the frame; and performing video inferencing utilizing the trained policy network and the trained recognition network based on the precision policy.

In one aspect, a computer program product comprises a computer readable storage medium having program instructions embodied therewith, the program instructions executable by a computer to cause the computer to perform operations comprising training a recognition network for a selected video frame at a desired highest precision using back-propagation; training a policy network using back-propagation from the trained recognition network; training the recognition network at a lower precision specified by a policy recommended for the selected video frame by the trained policy network; inputting a frame of a given video to the trained policy network for determination of a precision policy for processing the frame; and performing video inferencing utilizing the trained policy network and the trained recognition network based on the precision policy.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

improved video inference processing in terms of speed, computational resources and storage requirements;

any-precision recognition networks that can process video frames utilizing different precisions on a frame-by-frame basis;

a policy network trained to identify an optimal precision for performing video inferencing on a frame-by-frame basis; and reduced usage of computational resources and improved speed performance by utilizing a reduced precision recognition network for certain video frames.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 illustrates video recognition results on the first dataset and the second dataset, in accordance with an example embodiment;

FIG. 9A illustrates a comparison with state-of-the-art methods on the first dataset and the second dataset, in accordance with an example embodiment;

FIG. 9B illustrates a comparison of the disclosed approach with state-of-the-art methods on the third dataset and the fourth dataset, in accordance with an example embodiment;

FIG. 11 illustrates the transferability of the learned policy, in accordance with an example embodiment;

FIG. 12 illustrates qualitative examples from the first dataset, in accordance with an example embodiment;

FIG. 14 illustrates a table summarizing the effect of different losses on the first dataset, in accordance with an example embodiment;

FIG. 15 illustrates a table summarizing the effect of different decision space on the first dataset, in accordance with an example embodiment.

DETAILED DESCRIPTION

Figure 1:
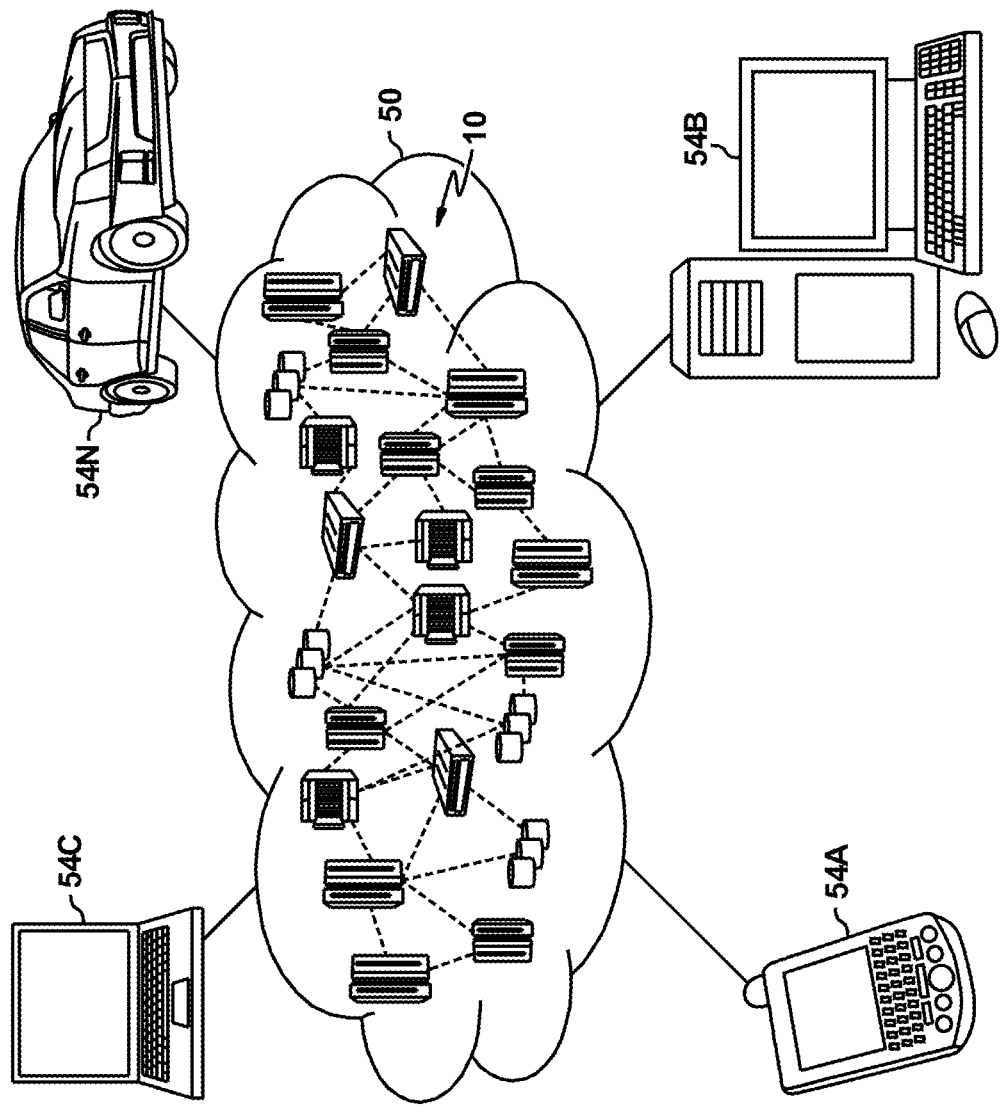
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
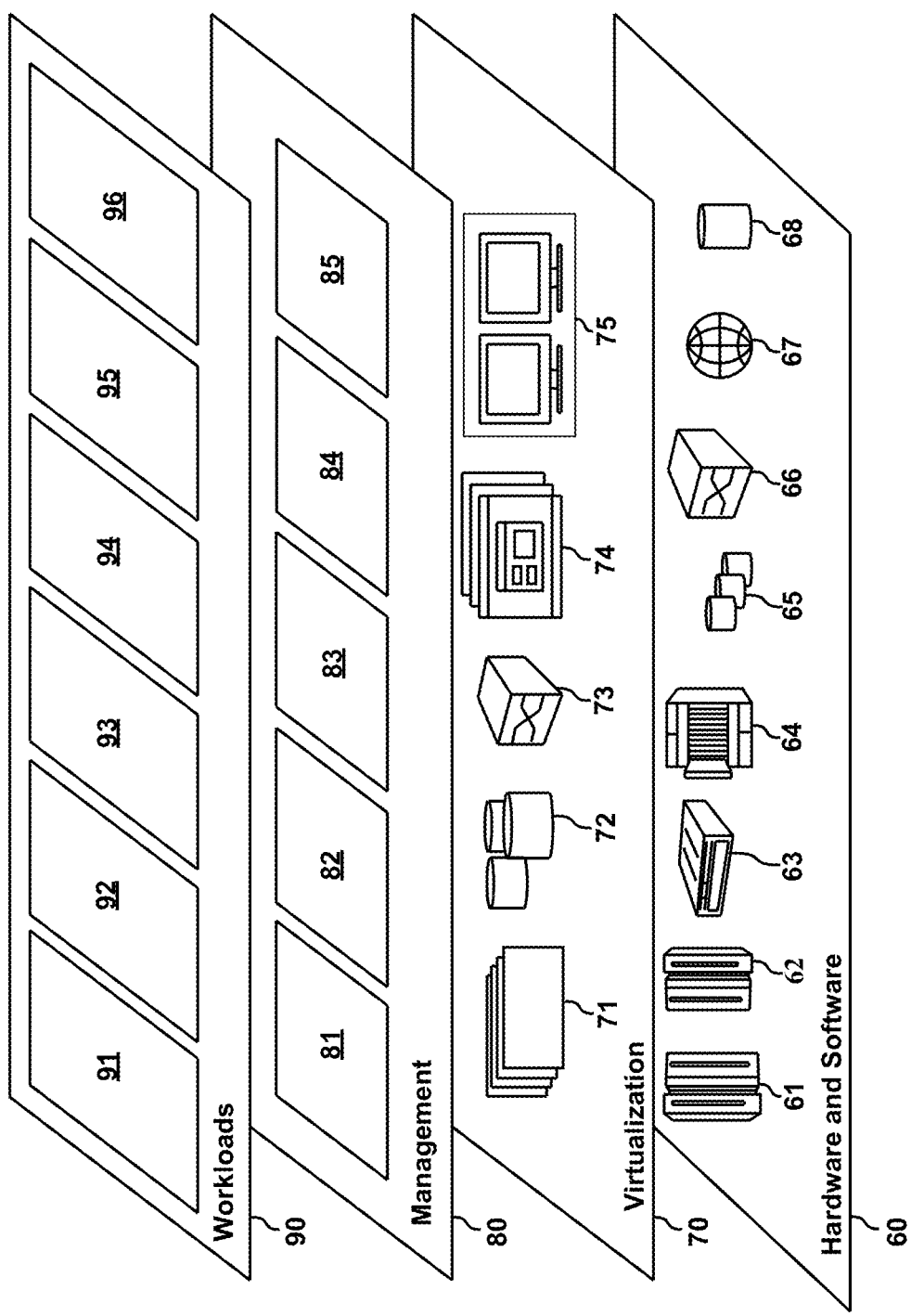
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a system for dynamic video inference processing 96.

Figure 3:
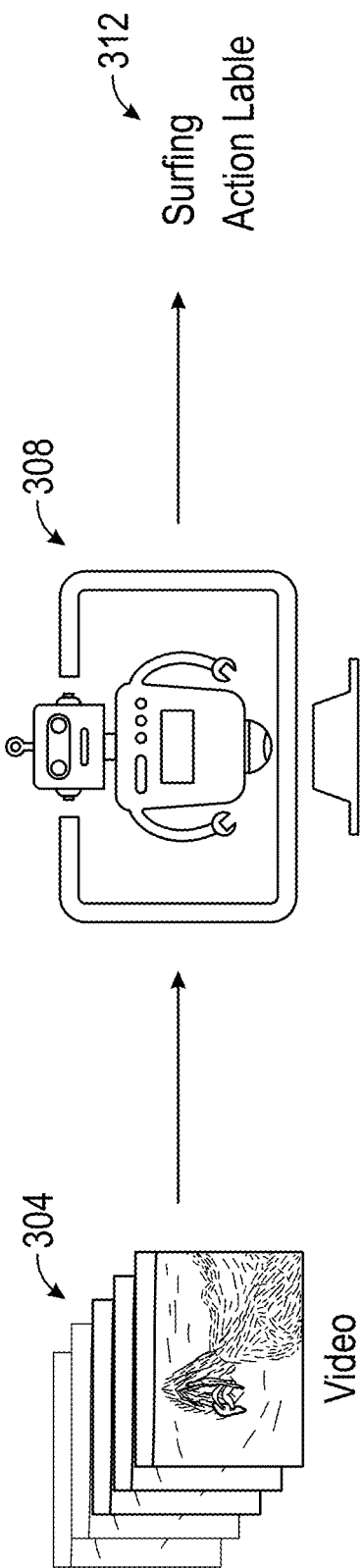
FIG. 3 is a high-level view of a video classification system.

FIG. 3 is a high-level view of a video classification system 308. Videos 304 are processed by the video classification system 308 to label the videos 304 with an action label of "surfing" 312. Deep convolutional networks have recently achieved great success in video recognition, yet their practical realization remains a challenge due to the large amount of computational resources required to achieve robust recognition.

We have found that quantization is effective for boosting efficiency. One or more embodiments advantageously provide a dynamic network quantization framework that selects an optimal precision for each video frame, conditioned on the input, to enable efficient video recognition. Specifically, given a video clip 304, a very lightweight network is trained in parallel with the recognition network to produce a dynamic policy indicating which numerical precision is to be used per frame in recognizing videos 304. Both networks are effectively trained using standard backpropagation with a loss to achieve both competitive performance and resource efficiency required for video recognition.

INTRODUCTION

Figure 4A:
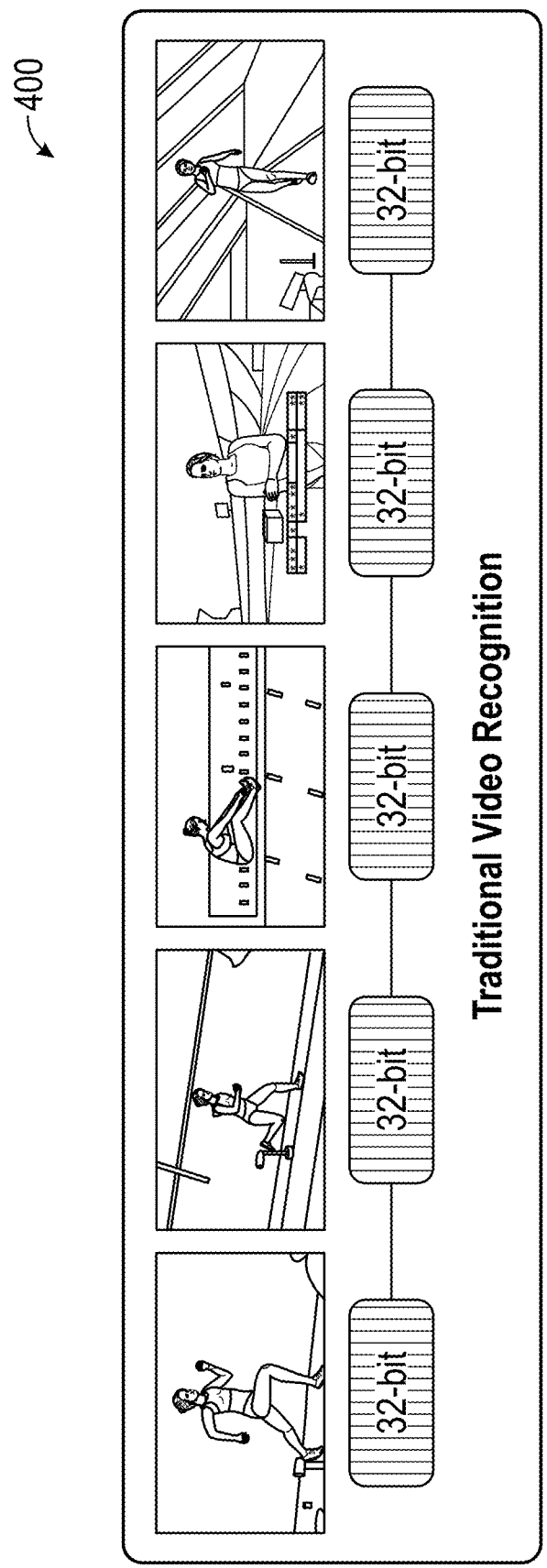
FIG. 4A illustrates the processing of video frames by a conventional video recognition system.

FIG. 4A illustrates the processing of video frames 400 by a conventional video recognition system. With the availability of large-scale video datasets, deep learning models based on two-dimensional/three-dimensional (2D/3D) convolutional neural networks (CNNs) have dominated the field of video recognition. Despite impressive performance on standard benchmarks, however, efficiency remains a great challenge for many resource-constrained applications, due to the heavy computational burden of deep CNN models. Motivated by the need for efficiency, existing research efforts mainly focus on either designing compact models or on a sampling of salient frames for efficient recognition. While these methods have shown promising results, they generally use 32-bit precision for processing all the frames in a given video 304, as illustrated in FIG. 4A, limiting their achievable efficiency. Specifically, orthogonal to the network design, the computational cost of a CNN is directly affected by the bit-width of weights and activations, which is recognized by the disclosed embodiments as another degree of freedom for efficient video inference. To illustrate this, consider a video processed using two different methods.

Figure 4B:
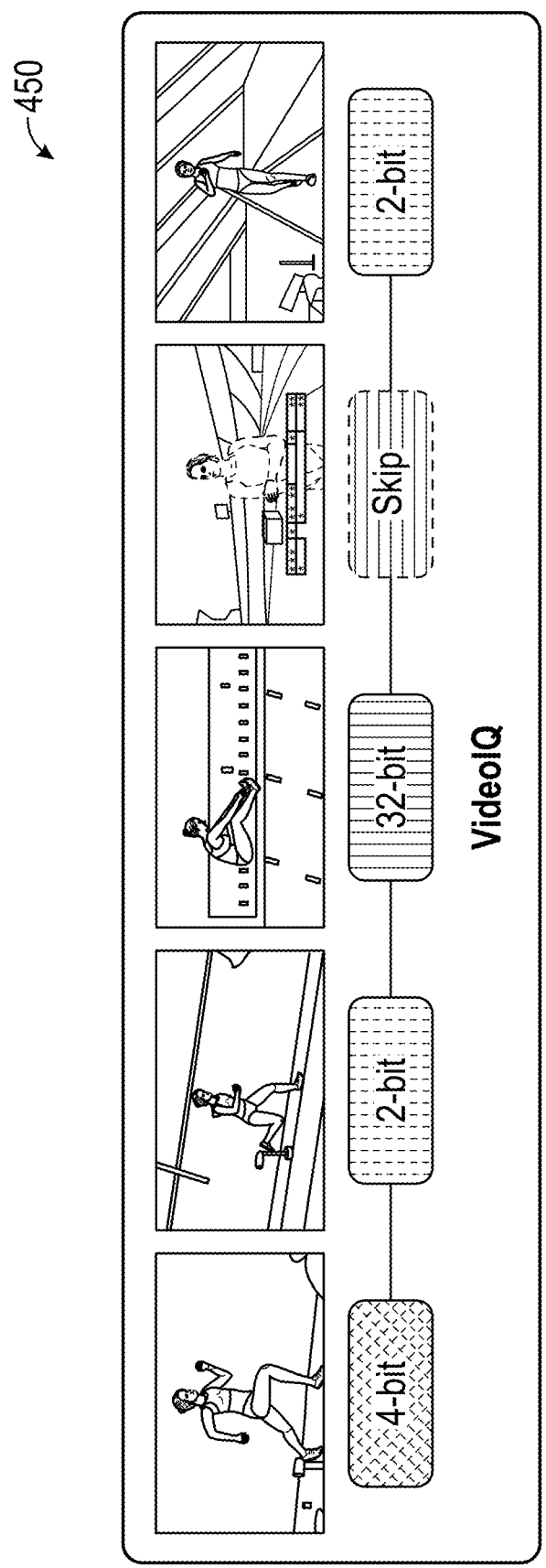
FIG. 4B illustrates the processing of a video represented by five uniformly sampled frames processed, in accordance with an example embodiment.

FIG. 4A illustrates the processing of a video 304 represented by five uniformly sampled frames processed using conventional video recognition. FIG. 4B illustrates the processing of a video 304 represented by five uniformly sampled frames 450, processed in accordance with an example embodiment. Instead of processing all the video frames with the same 32-bit precision, the disclosed technique, referred to as Video Instance-aware Quantization ("VideoIQ"), learns to dynamically select optimal quantization precision conditioned on input clips for efficient video recognition. It is computationally very efficient to process more informative frames with high precision and less informative frames with lower precision, without sacrificing accuracy. It will be seen that only the third frame needs to be processed using 32-bit precision as this is the most informative frame for recognizing the action "Long Jump," while the rest of the frames can be processed at very low precision, or even skipped (i.e., precision set to zero) without sacrificing accuracy, resulting in large computational savings compared to processing all frames with the same 32-bit precision (as is generally done in conventional video recognition methods).

In one example embodiment, VideoIQ utilizes an input-dependent dynamic network quantization strategy for efficient video recognition. Dynamic network quantization poses significant challenges, including: (1) how to efficiently determine what quantization precision to use per target instance (frame); and (2) how can the weights and activations of a single deep recognition network be flexibly quantized into various precision levels, without additional storage or computation cost, given instance-specific precisions.

To address the aforementioned challenges, one or more embodiments employ an end-to-end differentiable approach to learn a decision policy that selects an optimal precision conditioned on the input, while taking both accuracy and efficiency into account (in recognizing complex actions). This is achieved, for example, by sampling the policy from a discrete distribution parameterized by the output of a lightweight policy network, which decides on-the-fly what precision should be used on a per-frame basis. Since these decision functions are discrete and non-differentiable, the policy network is trained, in one or more embodiments, using standard back-propagation through Gumbel SoftMax sampling, without resorting to complex reinforcement learning. Moreover, in one or more embodiments, instead of storing separate precision-specific models, a single deep neural network is trained for action recognition using joint training, which enables the direct adjustment of numerical precision by simply truncating the least significant bits, without performance degradation. The disclosed approach provides not only high computational efficiency but also significant savings in memory—a practical requirement of many real-world applications which has been largely ignored by prior techniques.

Aspects of Dynamic Network Quantization for Efficient Video Inference

Given T sampled frames from a video $V=\{x_1, x_2, \ldots, x_T\}$ with the action label y and a set of n candidate bit-widths (precisions) $B=\{b_1, b_2, \ldots, b_n\}$ (assuming $b_1 > b_2 > \ldots > b_n$), a goal is to seek (1) a policy function g: $V \rightarrow B^T$ that automatically decides the optimal bit-width b for the frame $x_i$ for processing in the recognition network, and (2) a single recognition network f $V \rightarrow y$ which can be quantized to different precisions in $\mathcal{B}$ without additional storage or computation cost. With the desired policy network g and recognition network f, a main objective is to improve accuracy, while taking the resource efficiency into account for video action recognition. Note that given the optimal bit-width b for the frame $x_i$, in one or more embodiments, all the network weights and activations are quantized to the same bit-width b, which is well supported by existing hardware.

Preliminaries

The full-precision network weights are denoted by W and the activations are denoted by A. Given a certain precision with bit-width b and a quantization function Q, the quantization of W and A is denoted as $Q(W, b) = \hat{W}_b$ and $Q(A, b) = \hat{A}_b$. A conventional weight quantization technique was used for weight quantization and a conventional activation quantization technique was used for activation quantization.

Weight Quantization

The conventional weight quantization technique normalizes W into [−1,1] and then rounds it to the nearest quantization levels:

$$\hat{W}_b = 2 \times \text{quantize}_b\left(\frac{\tanh(W)}{2\max\tanh(W)} + \frac{1}{2}\right) - 1, \quad (1)$$

$$\text{quantize}_b(x) = \frac{1}{2^b - 1} \times \lfloor (2^b - 1)x \rceil, \quad (2)$$

where $\lfloor \cdot \rceil$ is the rounding operation.

Activation Quantization

The conventional activation quantization technique introduces a learnable clipping value $\alpha$ for activations in each layer. More specifically, the activation A is first clipped into $[0, \alpha]$ and then rounded to the nearest quantization levels:

$$\hat{A}_b = \alpha \times \text{quantize}_b(\text{clip}(A, 0, \alpha)/\alpha)$$

Approach Overview

Figure 5:
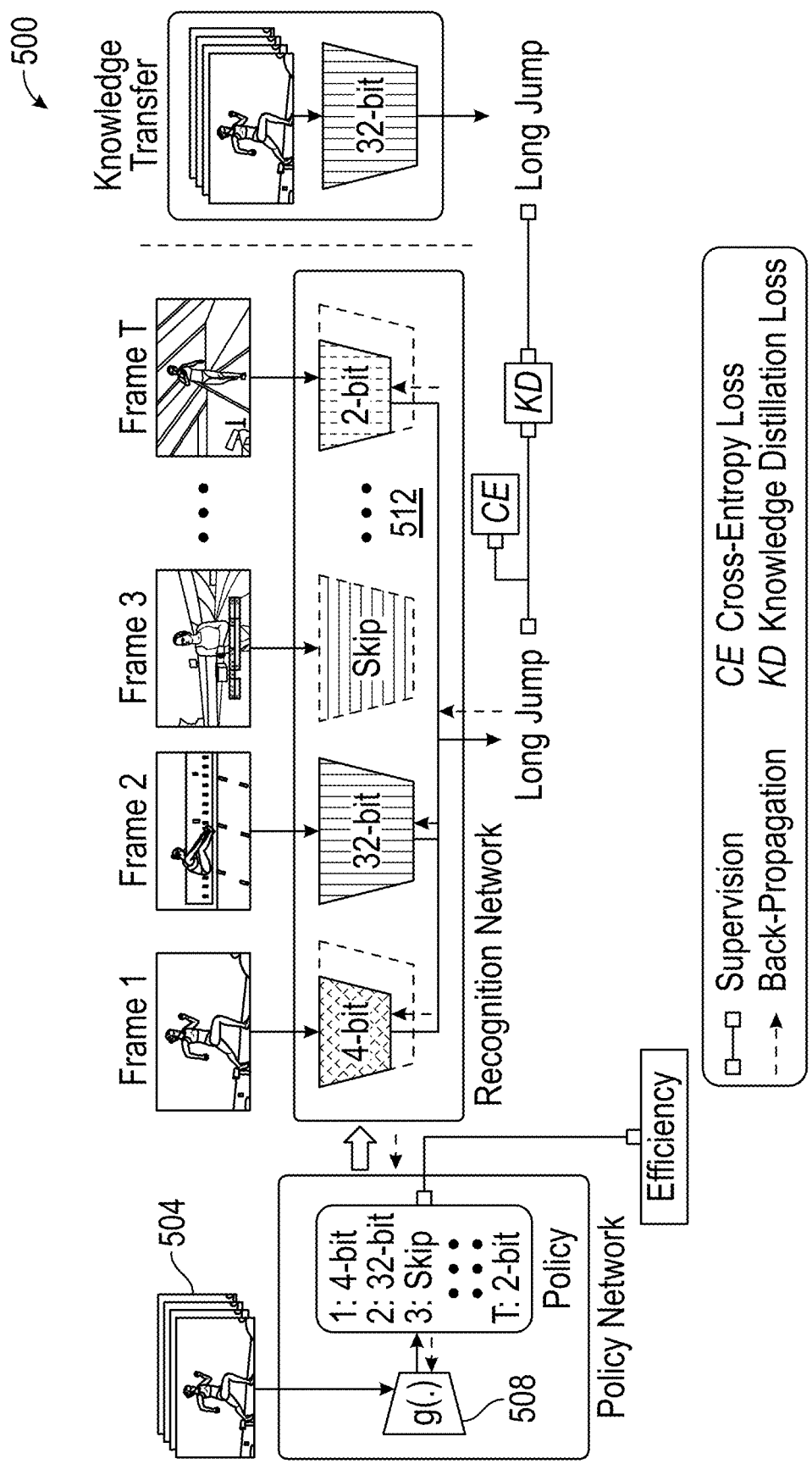
FIG. 5 illustrates an overview of an example workflow, in accordance with an example embodiment.
Figure 6:
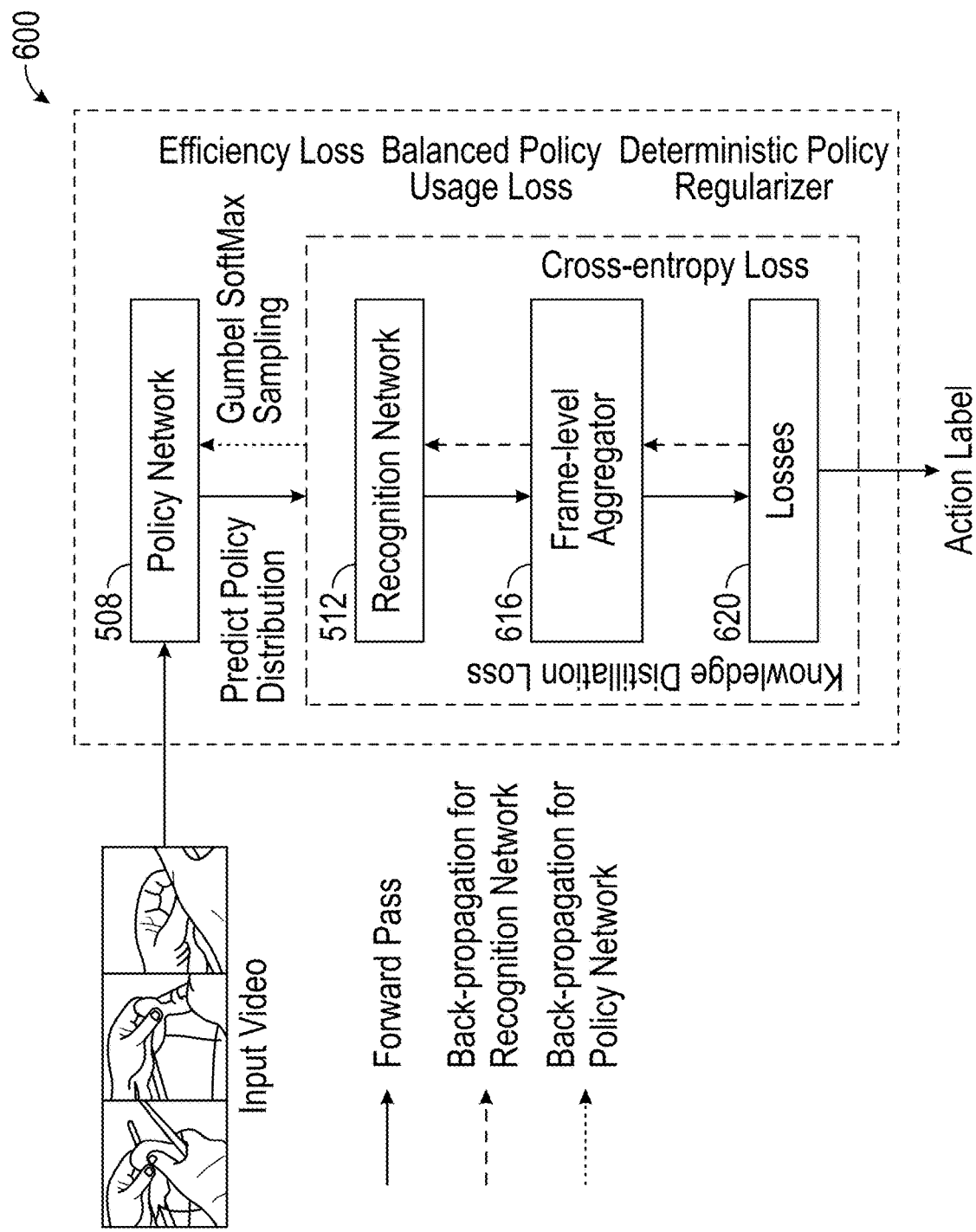
FIG. 6 illustrates an overview of the losses and back-propagation utilized in training the policy network and the recognition network, in accordance with an example embodiment.

FIG. 5 illustrates an overview of an example workflow 500, in accordance with an example embodiment. VideoIQ includes a very lightweight policy network 508 and a single backbone network 512 for recognition which can be simply quantized to lower precisions by truncating the least significant bits. The policy network 508 decides what quantization precision to use on a per frame basis on input 504, in pursuit of a reduced overall computational cost, without sacrificing recognition accuracy. Both networks 508, 512 are neural networks trained using back-propagation with a combined loss of standard cross-entropy and efficiency for video recognition. FIG. 6 illustrates an overview 600 of the losses and back-propagation utilized in training the policy network 508 and the recognition network 512, in accordance with an example embodiment. The policy network 508 is trained using back-propagation from the recognition network 512 and the recognition network 512 is trained using back-propagation from a frame-level aggregator 616 and calculated losses 620. In one example embodiment, the frame-level aggregator 616 performs a mathematical averaging of the output of the recognition network 512.

Knowledge is additionally distilled from a pre-trained full-precision model to guide the training of lower precisions. During inference, each frame is sequentially fed into the policy network 508 to select optimal precision for processing the current frame through the recognition network 512 and then the recognition network 512 averages all the frame-level predictions to obtain the video-level prediction.

In general, an instance-specific policy $a_i$, which decides on-the-fly which precision to use (or even skip) for processing the current frame $x_i$, is learned, and a video classifier f, which can be flexibly quantized to the desired precision of the current frame by simply truncating the least significant bits without any extra computation or memory cost, is also learned. To this end, VideoIQ includes a lightweight policy network g and a video recognition network f. The policy network g contains a feature extractor and a long short-term memory (LSTM) module to learn the discrete decisions regarding which precision to use, per input frame (see section below entitled Learning Dynamic Quantization Policy). Moreover, it is often unnecessary and inefficient to process every frame in a video 304 due to large redundancy resulting from static scenes or frame quality being very low. Thus, frames are skipped (i.e., precision set to zero), in addition to dynamic selection of precisions in a unified framework, to improve efficiency in video recognition. To further enable flexible and scalable quantization, in one or more embodiments, the video classifier is learned as an any-precision network and a simple yet effective optimization scheme is designed to ensure that the single set of network weights get executed with multiple precisions without additional storage and computation cost (see section below entitled Any-precision Video Recognition).

During the training, the any-precision recognition network 512 is learned and the policy network 508 is optimized with Gumbel-SoftMax Sampling through standard backpropagation. The loss is designed to achieve both competitive performance and computational efficiency (measured by FLOPS) required for video recognition. Knowledge is additionally distilled from a pre-trained full-precision model to guide training of the lower precisions. During the inference phase, each video frame 504 is sequentially fed into the policy network 508 whose output decides the right precision to use for the given frame, and then the frame is processed through the recognition network 512 with the predicted precision, to generate a frame-level prediction. Finally, the recognition network 512 averages predictions of all the frames as the final video-level prediction. It is worth noting that the policy network 508 is designed to be very lightweight so that its computational overhead is negligible.

Learning Dynamic Quantization Policy

VideoIQ learns the frame-wise policy $a_i$ to decide at which precision to process the frame $x_i$ (or to directly skip it, where skipping can be viewed as processing the frame with 0-bit precision). Thus, the entire action space is $\Omega = \mathcal{B} \cup \{0\}$. A decision $a_i \in \Omega$, $\forall i \in [1, T]$ is generated from the policy network g sequentially. The policy network 508 includes a feature extractor $\phi$ followed by an LSTM module:

$$h_i, o_i = \text{LSTM}(\phi(x_i), h_{i-1}, o_{i-1}), \quad (3)$$

where $h_i$ and $o_i$ are hidden state and outputs of LSTM at the time step i. The distribution $\pi_i = \mathbb{R}^{|\Omega|}$ is further computed over action space $\Omega$ from $h_i$:

$$\pi_i = \text{Softmax}(f_C(h_i)). \quad (4)$$

However, sampling policy $a_i$ from the discrete distribution $\pi_i$ is non-differentiable, which makes direct optimization difficult. One way to solve this is to model the optimization problem as a reinforcement learning problem, and then derive the optimal parameters of the policy network 508 using policy gradient methods. While some embodiments can employ policy gradient, one or more embodiments advantageously employ Gumbel-SoftMax Sampling to circumvent this non-differentiability and make the disclosed framework fully differentiable, overcoming potential issues with: complexity, training unwieldiness, requirement for variance reduction during training, and requirement for careful selection of reward functions.

Gumbel-SoftMax Sampling

The Gumbel SoftMax technique substitutes the original non-differentiable sample from a discrete distribution with a differentiable sample from a corresponding Gumbel-SoftMax distribution.

Specifically, instead of directly sampling $a_i$ from its distribution $\pi_i$, it is generated as, $$a_i = \arg\max_{j \in \Omega}(\log \pi_i(j) + G_i(j)), \quad (5)$$

where $G_i = -\log(-\log U_i)$ is a standard Gumbel distribution with $U_i$ sampled from a uniform distribution Unif(0,1). To remove the non-differentiable argmax operation in Eq. 5, the Gumbel SoftMax technique relaxes one-hot $(a_i) \in \{0,1\}^{|\Omega|}$ (the one-hot encoding of $a_i$) to $p_i \in \mathbb{R}^{|\Omega|}$ with the reparameterization technique:

$$p_i(j) = \frac{\exp((\log \pi_i(j) + G_i(j))/\tau)}{\sum_{k \in \Omega}((\log \pi_i(k) + G_i(k))/\tau)}, \quad (6)$$

where $j \in \Omega$ and $\tau$ is the temperature of the softmax. When $\tau > 0$, the Gumbel-Softmax distribution $p_i$ is smooth, so $\pi_i$ can be directly optimized by gradient descent, and when $\tau$ approaches 0, the soft decision $p_i$ becomes the same as one-hot $(a_i)$. In one example embodiment, $\tau$ is set to five as the initial value and it is gradually annealed down to 0 during training.

Any-Precision Video Recognition

Given frame-specific precisions, quantizing weights and activations of a single network while recognizing videos is a major challenge. A naïve strategy is to manually train different models tailored for the different precision and then route frames to the corresponding models to generate predictions. However, such a strategy requires time-consuming training for each of the models and also increases the memory storage cost, making it inefficient for many real-time applications. To tackle this problem, any-precision recognition, which makes a single model flexible to any numerical precision during the inference, is adopted. Specifically, the weight quantizer is first modified to enable the network parameters to be quantized to lower precision, with low computation cost after training. Then, a simple and effective learning scheme for training of the any-precision video recognition network is disclosed.

With the original quantization technique (Eq. 1 and 2), all numerical precisions need to be quantized down from the full-precision value. Thus, the repeated weight quantizations cause redundant computation when the recognition network 512 frequently switches across different precisions. To reduce computational cost of the switching operation, full precision weight W is quantized to the largest bit-width $b_1$ and then the least significant $b_1 - b$ bits are truncated to obtain quantized weight $\hat{W}_b$. The quantized $b_1$-bit network weights are saved after the training. Benefiting from this modified quantization, only the extra bits need to be discarded to switch to lower precisions during inference. Furthermore, $\mathbb{E}[\hat{W}_b]$ is aligned with $\mathbb{E}[\hat{W}_{b1}]$ to minimize the mean discrepancy caused by discarded bits.

A single network is jointly trained under different bit-widths with shared weights for any-precision video recognition. Specifically, losses of all precisions with the same input batch are gathered and the recognition network 512 is updated. To obtain the loss of precision with bit-width b, the input video is fed and network weights and activations are quantized to b-bits for every frame. To resolve mismatch in statistics of activations with different precisions, a separate set of Batch Normalization layers and clipping level parameters for different precisions are employed in one or more embodiments. Moreover, following the success of knowledge distillation, knowledge from a pretrained full-precision recognition network is transferred to guide training of lower precisions, because the full-precision weights are expected to give confident predictions: valuable knowledge is provided in its soft logits, while the low-precision student gains the knowledge by mimicking the teacher.

Losses

For video action recognition, standard cross-entropy loss is minimized between predicted label and ground truth action:

$$\mathcal{L}_{ce}(V|A) = \mathbb{E}\left[-y \log(f(V|A))\right], \quad (7)$$

where $A = a_1, a_2, \ldots, a_T$ represents precisions to use for the sampled T frames, which can be either predicted by the lightweight policy network 508 (A=g (V)) or set manually.

To better guide the optimization of the model with lower capacity, e.g. the recognition network 512 with lower precision, a distillation loss $L_{kd}$ is utilized to transfer knowledge from a pretrained full-precision video recognition network (teacher) by taking Kullback-Leibler (KL) divergence between soft-logits of the disclosed model $y_a$ and of the teacher network $y_t$ as $$\mathcal{L}_{kd}(V \mid A) = KL(y_t \parallel y_A) = \sum_{i=1}^{m} (y_t)_i \log \frac{(y_t)_i}{(y_A)_i}, \quad (8)$$

where m is the number of video categories and $(\bullet)_i$ denotes the i-th element of the vector. Thus, given the input video V, the overall loss $\mathcal{L}_f$ to optimize the any-precision video recognition network f is defined as $$\mathcal{L}_f(V) = \Sigma_{A=b_1^T, \ldots b_n^T} \mathcal{L}_{ce}(V|A) + \mathcal{L}_{kd}(V|A). \quad (9)$$

To address computational efficiency, the FLOPS needed for one frame to be processed in the network 512 are pre-computed with different candidate precisions in B. FLOPs usage per video 504 is directly minimized with the generated policy A, to reduce the computational cost as $$\mathcal{L}_e(A) = \Sigma_{i=1}^{T}(\text{FLOP}(a_i)). \quad (10)$$

Furthermore, two additional regularizers are introduced to better optimize the policy network. First, a balanced policy usage is enforced over the entire action space to avoid the policy network learning some sub-optimal solutions where some actions are totally ignored. More formally, the balanced policy usage loss $\mathcal{L}_b$ is defined as $$\mathcal{L}_b(A) = \sum_{k \in \Omega} \left( \mathbb{E}\left[\frac{1}{T}\sum_{i=1}^{T} \mathbb{1}(a_i = k)\right] - \frac{1}{|\Omega|} \right). \quad (11)$$

Second, the entropy of the learned probability distribution is minimized over the action space $\Omega$ of each frame. This forces the policy network 508 to avoid randomness during the inference by generating a deterministic prediction for the precision to use for each video frame:

$$\mathcal{L}_d(\pi) = \Sigma_{i=1}^{T} H(\pi_i), \quad (12)$$

where $H(\bullet)$ is the entropy function. Finally, the overall loss $\mathcal{L}_g$ to optimize the policy network g is defined as $$\mathcal{L}_g(V) = \mathcal{L}_{ce}(V|A) + \mathcal{L}_{kd}(V|A) + w_1 \mathcal{L}_e(A) + w_2 \mathcal{L}_b(A) + w_3 \mathcal{L}_d(\pi), \quad (13)$$

where A=g(V) and $w_1$, $w_2$ and $w_3$ are hyperparameters to balance loss terms. In summary, the any-precision recognition network 512 f is jointly trained with all precisions in B (using Eq. 9), and then the policy network 508 g is trained (using Eq. 13) to generate policy over the action space $\Omega$ per input frame.

Figure 7A:
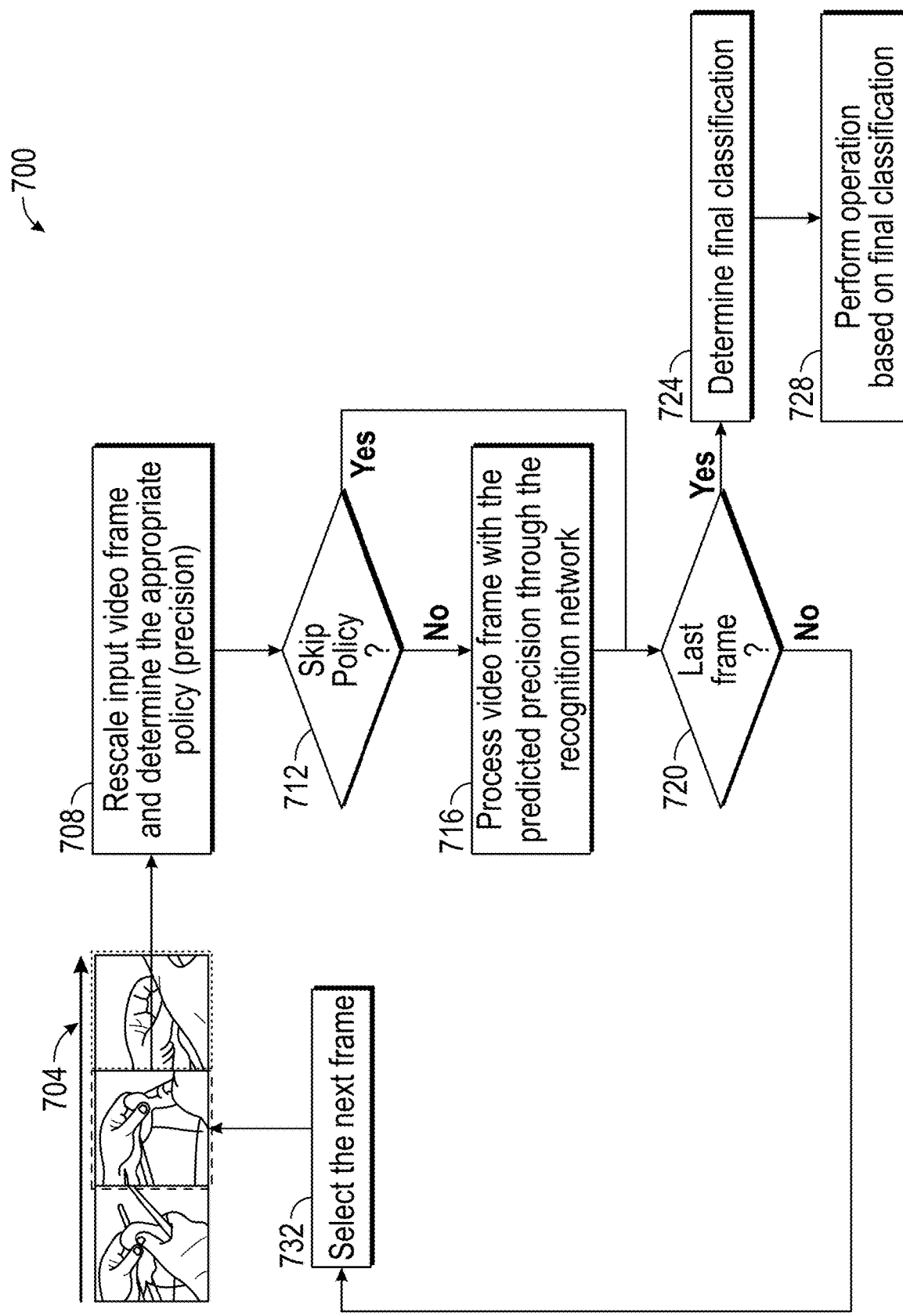
FIG. 7A is a flowchart for an example inferencing method, in accordance with an example embodiment.

FIG. 7A is a flowchart for an example inferencing method 700, in accordance with an example embodiment. In one example embodiment, input video frames 704 are rescaled and processed by the policy network 508 to determine the appropriate policy (precision) (operation 708). The rescaling reduces the size of the input video frame 704 to reduce the time and resources needed for processing each input video frame 704. For example, each input video frame 704 may be reduced to a size of 84×84 pixels. A check is performed to determine if the determined policy is to skip the corresponding frame (decision block 712). If the determined policy is to skip the corresponding frame (YES branch of decision block 712), the method 700 proceeds with operation 720; otherwise (NO branch of decision block 712), the rescaled input video frame 704 is processed by the recognition network 512 (operation 716).

A check is performed to determine if the selected video frame 704 is the last video frame 504 of the video 504 (decision block 720). If the selected video frame 704 is the last video frame 704 (YES branch of decision block 720), the final classification is determined by, for example, averaging the previous predictions (operation 724); otherwise (NO branch of decision block 720), the next frame 704 is selected (operation 732) and the method 700 proceeds with operation 708.

In one example embodiment, following the determination of the final classification (operation 724), an operation is performed based on the final classification (operation 728). For example, a given video may be processed by the policy network 508 and the recognition network 512 to, for example, classify objects in the video. In the case of autonomous vehicles, a video captured by an autonomous vehicle may be processed by the policy network 508 and the recognition network 512 to identify objects, such as other moving vehicles in the vicinity of the autonomous vehicle. The location of the identified objects may then be utilized to control the autonomous vehicle. In one example embodiment, robots are similarly controlled by classifying objects in a video captured by the robots. In one example embodiment, the objects identified in the video are utilized to index the video(s) for search in a content management system.

Figure 7B:
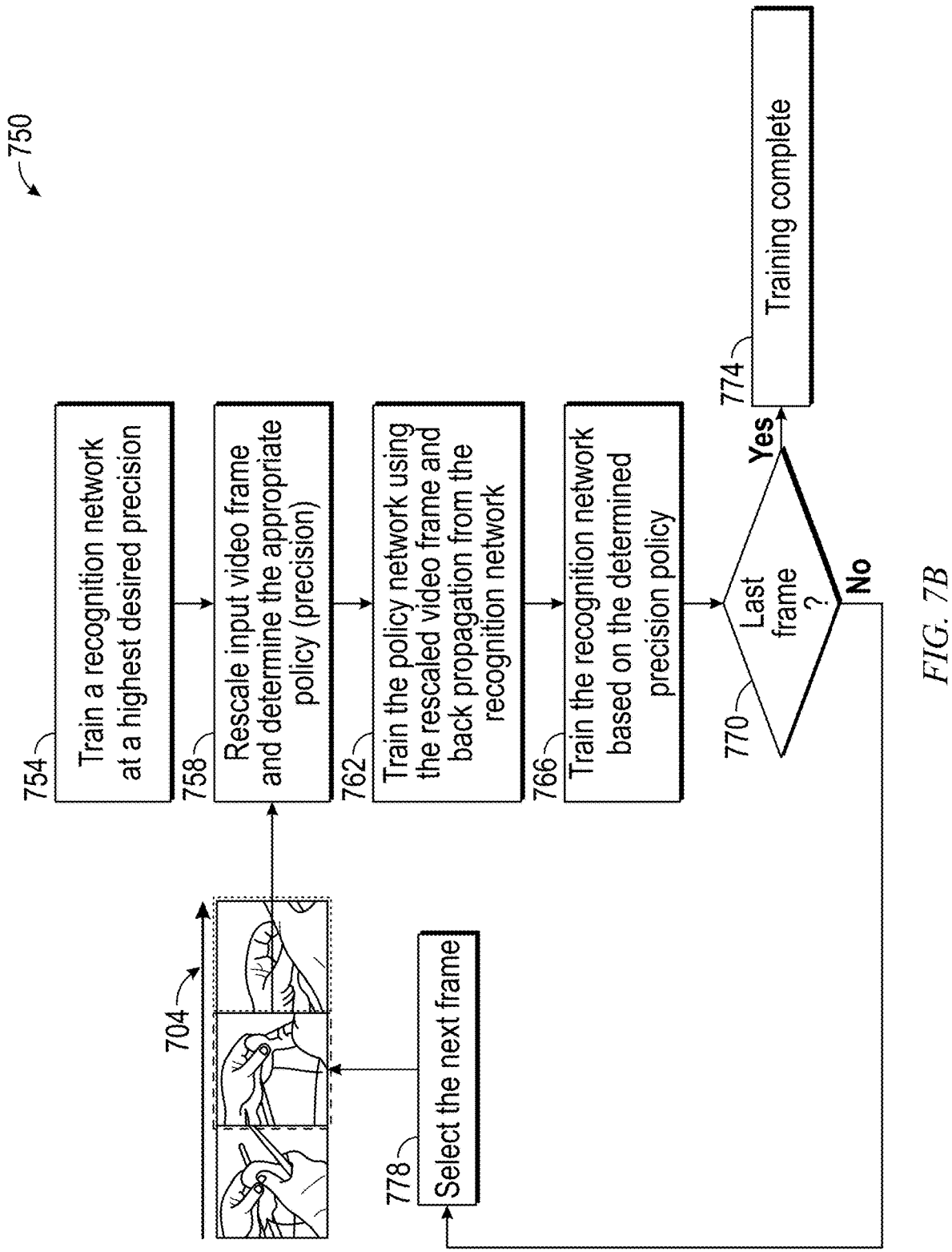
FIG. 7B is a flowchart for an example training method, in accordance with an example embodiment.

FIG. 7B is a flowchart for an example training method 750, in accordance with an example embodiment. The recognition network 512 is trained using back-propagation at a bit-width of the highest desired precision (operation 754). For example, the recognition network 512 may be trained using back-propagation at a bit-width of 32 bits. In one example embodiment, the recognition network 512 is trained using standard back-propagation through Gumbel SoftMax sampling. A selected input video frame 704 is rescaled and processed by the policy network 508 to determine the appropriate policy (precision) (operation 758). The rescaling reduces the size of the input video frame 704 to reduce the time and resources needed for processing each input video frame 704. For example, each input video frame 704 may be reduced to a size of 84×84 pixels. The policy network 508 is trained using the rescaled input video frame 704 and back-propagation from the recognition network 512 (operation 762). In one example embodiment, the policy network 508 is trained using standard back-propagation through Gumbel SoftMax sampling. The recognition network 512 is trained using the rescaled input video frame 704 and back-propagation at a bit-width corresponding to the policy of the selected video frame (operation 766). A test is performed to determine if all of the training frames have been processed (decision block 770). If all the training frames have not been processed (NO branch of decision block 770), the method 750 proceeds with operation 778 where the next input video frame 704 is selected; otherwise (YES branch of decision block 766), the training is complete 774 and the method 750 ends.

Extensive experiments on four challenging diverse benchmark datasets demonstrate that the disclosed approach provides significant savings in computation and memory usage while outperforming the existing state-of-the-art methods.

Extensive experiments were conducted on four standard video recognition datasets to demonstrate the superiority of the disclosed approach over state-of-the-art methods. The results show that one or more exemplary embodiments of VideoIQ can yield significant savings in computation and memory (e.g., average 26.0% fewer giga floating-point operations (GFLOPs) and 55.8% less memory), while achieving better recognition performance, over the most competitive baseline. The decision policies learned using the disclosed methods are transferable to unseen classes and videos across different datasets. Furthermore, qualitative results suggest that the learned policies correlate with the distinct visual patterns in video frames 304, i.e., one or more exemplary embodiments utilize 32-bit full precision only for relevant video frames 304 and process non-informative frames 304 at low precision, or skip them entirely, for computational efficiency.

EXPERIMENTS

Experimental Setup

Datasets

An exemplary embodiment was evaluated using four datasets. The first dataset contains 10,000+ videos for training and approximately 5,000 videos for validation across 200 categories. The second dataset consists of 40,000+ videos for training and 40,000+ videos for testing across 200+ classes. The third dataset is a subset of a full conventional dataset containing 30 videos per class in training and 10 videos per class in testing over 400 classes. The fourth dataset is a subset of a full conventional dataset containing 100,000+ videos for training and approximately 10,000 videos for testing across 200 classes.

Implementation Details

A conventional convolutional neural network (CNN) is adopted to aggregate the predictions over T=16 uniformly sampled frames from each video 504. Two conventional backbones were used for the recognition network 512 while a conventional lightweight backbone network combined with a single-layer LSTM (with 512 hidden units) was employed to serve as policy network 508 in the experiments. To save computation, lower resolution images (84×84) were used in the policy network 508. The action space was set to $\Omega=\{32, 4, 2, 0\}$ in all experiments, i.e., the policy network 508 could choose either: (i) one out of $\{32, 4, 2\}$ precision or (ii) skip frame, for efficient recognition. The any-precision recognition network 512 (pretrained from weights of a conventional model) was trained for 100 epochs to provide a good starting point for policy learning and then the policy network 508 was trained for 50 epochs on all datasets. Separate sets of learning parameters (learning rate, weight decay) were used for clipping values of each precision. The input, first layer and last layer of the network 512 were not quantized.

Baselines

The disclosed approach was compared with the following baselines and existing approaches. First, a 2D-CNN (two-dimensional convolutional neural network) based "Uniform" baseline that uses 32-bit precision was considered to process all the sampled frames and the frame-level results were then averaged as the video-level prediction. An exemplary embodiment was also compared with two more variants of uniform baseline that uses lower precisions, such as 4-bit and 2-bit respectively, to process the video frames. Second, an exemplary embodiment was compared with an "Ensemble" baseline that gathers all the frame-level predictions by processing them at different precisions (instead of selecting an optimal precision per frame). This serves as a very strong baseline for classification, at the cost of heavy computation. Finally, an exemplary embodiment was compared with existing efficient video recognition approaches.

Metrics

Either mAP (mean average precision) or Top-1 accuracy was computed, depending on the dataset, to measure performance of different methods. Computational cost with giga floating-point operations (GFLOPs) was measured, which is a hardware-independent metric. Specifically, given the FLOPs of a full-precision layer a, the FLOPs of m-bit weight and n-bit activation quantized layer are $$\frac{mn}{64} \times a.$$

Memory usage (MB) represented by the storage for parameters of the network was measured.

Results and Analysis

Comparison with Traditional Uniform Baselines

VideoIQ was compared using different conventional backbones to show how much performance an exemplary embodiment of the dynamic approach, VideoIQ, can achieve compared to simple 2D-CNN based baselines on both the first and second datasets. FIG. 8 illustrates video recognition results on the first dataset and the second dataset, in accordance with an example embodiment. As shown in the table of FIG. 8, the exemplary embodiment consistently outperforms the full-precision uniform baseline (32-bit) in both mAP and GFLOPS, with minimal increase in memory on both datasets. Using a first backbone, an exemplary embodiment of VideoIQ obtains a mAP of 70.9% and 79.1%, requiring 9.5 and 9.4 GFLOPS on the first and second datasets, respectively. Uniform quantization with low bit-widths leads to a significant reduction in computation and memory, but they suffer from a noticeable degradation in recognition performance, e.g., the 2-bit performance is 4.5% and 3.3% lower than the 32-bit counterpart on the first and second datasets, respectively.

Similarly, with a second conventional backbone, an exemplary embodiment of VideoIQ offers 56.7% (65.8 vs 28.1) and 58.9% (65.8 vs 27.0) savings in GFLOPS while outperforming the Uniform (32-bit) baseline by 2.1% and 2.7% in mAP on the first and second datasets, respectively. The exemplary embodiment was compared with an 8-bit Uniform Baseline that uses same percentage of random skipping as an exemplary embodiment of VideoIQ (i.e. 8% random skipping on the first dataset). With the second conventional backbone, the exemplary embodiment outperforms this baseline by 2.7% (72.1% vs 74.8%), showing the effectiveness of the learned policy in selecting optimal quantization precision per frame while recognizing videos 504.

As shown in the table of FIG. 8, Ensemble achieves comparable recognition performance because it is a very strong base-line that gathers all the predictions by processing frames through multiple backbones. However, the exemplary embodiment of VideoIQ provides 67.4% and 68.7% computational savings including a 10% savings in memory over the Ensemble baseline on the first and second datasets, respectively, showing the importance of instance-aware dynamic quantization for efficient video recognition. Moreover, the exemplary embodiment of VideoIQ was compared with a Weighted Ensemble baseline, where weights are assigned based on entropy of SoftMax scores to reflect prediction confidence of different predictions. Only a 0.3% higher mAP is achieved while requiring 67.4% more computation than the exemplary embodiment of VideoIQ on the first dataset (75.1% vs 74.8%). Note that the exemplary embodiment of VideoIQ requires less computation on average on the second dataset than the first dataset, as the second dataset contains more static videos with high redundancy compared to the first dataset, which consists of action-centric videos with rich temporal information.

Comparison with State-of-the-Art Methods

FIG. 9A illustrates a comparison with state-of-the-art methods on the first dataset and the second dataset, in accordance with an example embodiment. The exemplary embodiment of VideoIQ achieves the best mAP while offering significant savings in both GFLOPS and Memory (MB). FIG. 9B illustrates a comparison of the disclosed approach with state-of-the-art methods on the third dataset and the fourth dataset, in accordance with an example embodiment. The exemplary embodiment of VideoIQ (using a conventional backbone) obtains the best performance with great savings in computation (GFLOPS) and memory (MB). The exemplary embodiment of VideoIQ is clearly better than all the compared methods in terms of both accuracy and resource efficiency (computation and memory), making it suitable for efficient video recognition. The exemplary embodiment of VideoIQ obtains a mAP (accuracy for the fourth dataset) of 74.8%, 82.7%, 46.4% and 72.3%, while requiring 28.1, 27.0, 26.8 and 20.4 GFLOPs on the first dataset, the second dataset, the third dataset and the fourth dataset, respectively. Note that while most of the compared methods reduce computation at the cost of significant increase in memory, the exemplary embodiment of VideoIQ improves computational efficiency by using a model whose memory size is just slightly larger than the 32-bit model.

Figure 10:
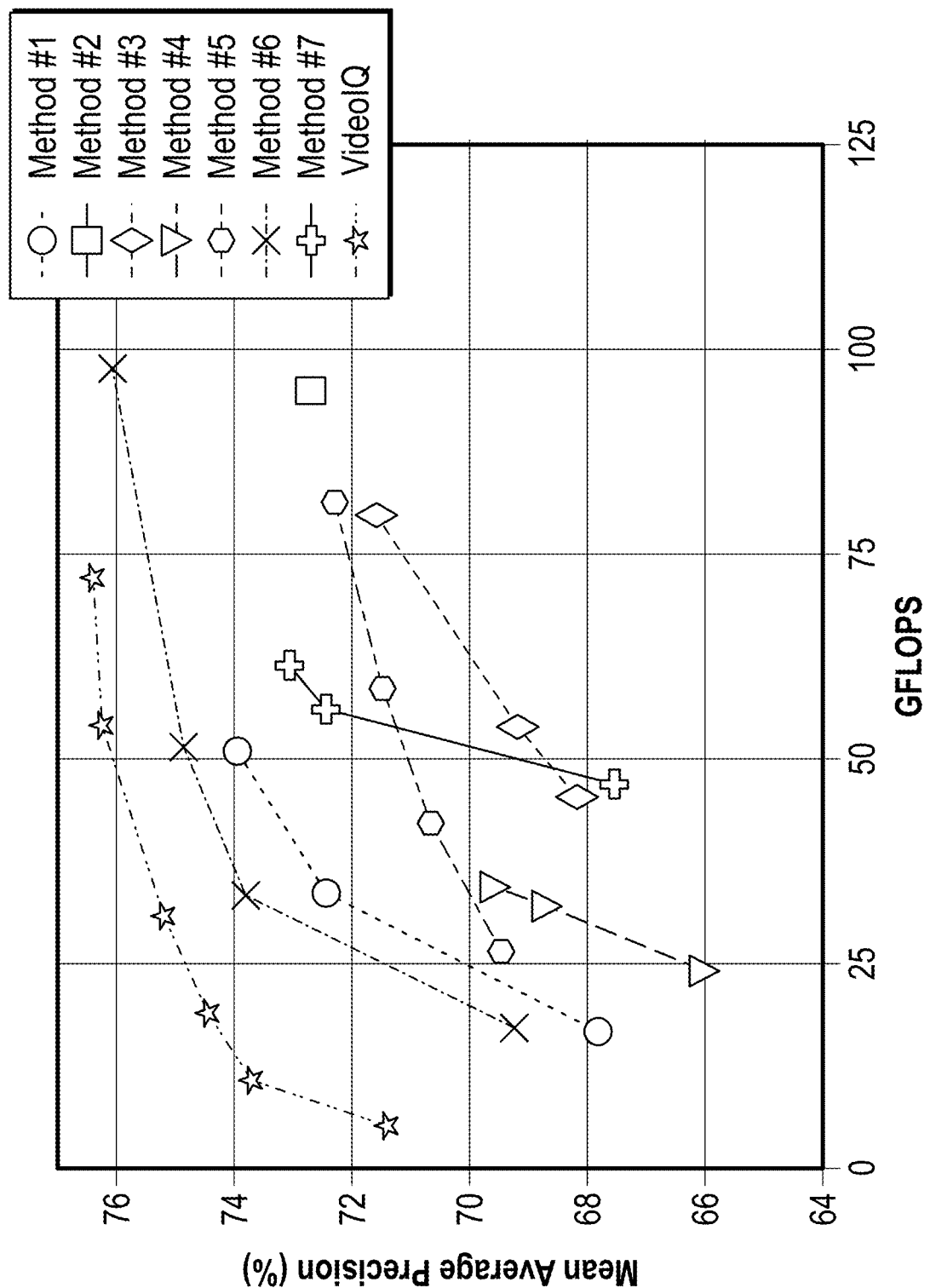
FIG. 10 is a graph of computational cost (GFLOPS) vs mean Average Precision (%) on the first dataset, in accordance with an example embodiment.

Referring to FIG. 10, among the compared methods, method #6 is the most competitive in terms of computational efficiency. However, the exemplary embodiment of VideoIQ consistently outperforms method #6 in recognition performance while providing 26.0% savings on average in computation and 55.8% savings in memory. This is because of two introduced components working in concert: dynamic quantization for computational efficiency and use of a single any-precision recognition network instead of separate models for memory efficiency. Likewise, when compared with the method #7, the disclosed approach offers an average 41.1% and 34.7% reduction in computation and storage memory while improving the recognition performance (maximum 2.3% on the third dataset) across all the datasets. Method #7 obtains the best performance compared to other existing methods on the fourth dataset but it fails to achieve similar performance on untrimmed video datasets. It is suspected that, being a method that relies on efficient reuse of history feature maps, it fails to aggregate the information of all time stamps when the video gets very long, as in untrimmed datasets. In summary, the exemplary embodiment of VideoIQ establishes a new state-of-the-art for the task of efficient video recognition on four datasets, improving previous best results in terms of accuracy, computational efficiency, and memory efficiency.

Still with reference to FIG. 10, the same is a graph of computational cost (GFLOPS) vs mean Average Precision (%) on the first dataset, in accordance with an example embodiment. The exemplary embodiment of VideoIQ (star points) achieves the best trade-off when compared to existing methods. FIG. 10 compares the exemplary embodiment of VideoIQ to the existing methods by varying computational budgets on the first dataset. The exemplary embodiment of VideoIQ consistently outperforms all the compared methods and achieves the best trade-off between computational cost and accuracy, which once again shows that the exemplary embodiment of VideoIQ is an effective and efficient design for video recognition.

Transferring Learned Policies

Transferability of the learned policy was analyzed by performing cross-dataset experiments, i.e., learning policy on one dataset while testing on the other. Specifically, the policy network 508 trained on one dataset is utilized directly for testing along with a trained any-precision recognition network 512 on another dataset. FIG. 11 illustrates the transferability of the learned policy, in accordance with an example embodiment. The table of FIG. 11 summarizes the results (where diagonal numbers refer to training and testing the quantization policy on the same dataset while non-diagonal numbers refer to learning the policy on one dataset (rows) and testing on others (columns)). As expected, training and testing on the same dataset provides the best performance on all cases (center diagonal line). However, the negligible difference among the values across each column clearly shows that policies learned using the disclosed method are transferable to unseen classes and videos 504 across different datasets.

Qualitative Analysis

FIG. 12 illustrates qualitative examples from the first dataset, in accordance with an example embodiment. The exemplary embodiment of VideoIQ processes more informative frames with high precision and less informative ones with lower precision, or skips them when irrelevant, for efficient video recognition. To better understand the learned policy, the selected precision per input frame was visualized. FIG. 12 illustrates a series of sampled video frames and a corresponding selected precision per input frame. Videos are uniformly sampled in 8 frames. Overall, the exemplary embodiment of VideoIQ focuses on the right quantization precision to use per frame for correctly classifying videos while taking efficiency into account. The exemplary embodiment of VideoIQ processes the most indicative frames in 32-bit precision while it uses lower precision (or skips) for frames that are irrelevant to the action (e.g., "Playing saxophone"). Similarly, after being confident about the prediction, it interestingly avoids using the 32-bit precision even if informative content appear later in the video.

Figure 13:
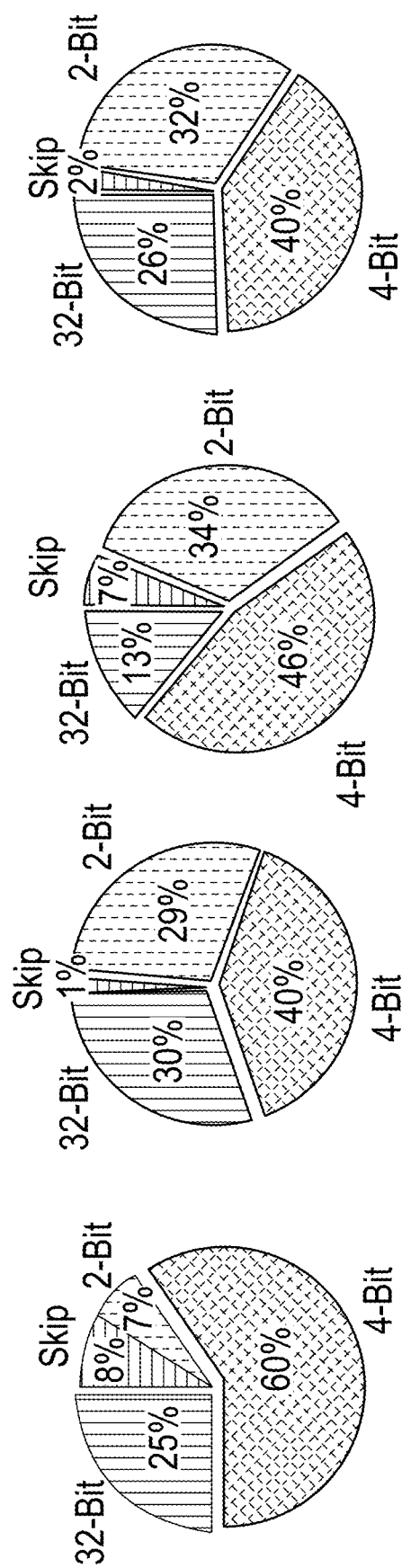
FIG. 13 shows the overall dataset-specific policy distribution on different datasets, in accordance with an example embodiment.

FIG. 13 shows the overall dataset-specific policy distribution on different datasets, in accordance with an example embodiment. The disclosed approach leads to distinctive policy patterns representing different characteristics of datasets. For example, while only a few frames on the first dataset use 2-bit precision, about 30% of the frames on the other datasets can be processed using 2-bit precision, leading to different amounts of computational savings across datasets. The exemplary embodiment of VideoIQ skips very few frames on the fourth dataset (2%), which is because the fourth dataset contains short, trimmed videos (6-10 seconds) while the remaining datasets consists of long untrimmed videos, lasting up to 5 minutes.

Ablation Studies

The following ablation experiments using a second backbone on the first dataset that show the effectiveness of different components in the exemplary embodiment of VideoIQ are presented.

Effect of Different Losses

FIG. 14 illustrates a table summarizing the effect of different losses on the first dataset, in accordance with an example embodiment. Training without knowledge transfer from the 32-bit model (top row: by turning off $\mathcal{L}_{kd}$) only obtains a mAP of 73.5% with similar GFLOPS as that of the exemplary embodiment of VideoIQ, which shows that it is important to utilize soft targets of the full-precision model as the teacher to guide lower precisions in learning. As expected, training by setting $\mathcal{L}_e$ to 0 achieves the highest mAP of 75.1% while requiring 38.5% more GFLOPS compared to the one that uses efficient loss in training (2nd vs 3rd row). Finally, adding both regularizations ($\mathcal{L}_b$ and $\mathcal{L}_d$) during the policy learning leads to the best performance with the least computation showing the effectiveness of different losses in the disclosed framework.

Effect of Decision Space

The effect of decision space $\Omega$ was investigated by using different combinations of precision and skipping. FIG. 15 illustrates a table summarizing the effect of different decision space on the first dataset, in accordance with an example embodiment. (Note that 0 indicates skipping the frame for processing by the classifier). As shown in the table of FIG. 15, only skipping frames (i.e., $\Omega=\{32, 0\}$) leads to a mAP of 72.9% while setting the decision space to choose only precisions (i.e., $\Omega=\{32, 4, 2\}$) leads to a mAP of 74.5% on the first dataset. Compared to all the alternatives, the best strategy is to combine the set of precisions with skipping by setting $\Omega=\{32, 4, 2, 0\}$ for achieving top performance of 74.8% in mAP with 28.1 GFLOPS on the first dataset.

Comparison with Random Policy

The random policy that uses the same backbone framework but randomly samples policy actions from uniform distribution was compared and it was observed that the exemplary embodiment of VideoIQ outperforms it by 2% in mAP (72.8% vs 74.8%) on the first dataset, which demonstrates the effectiveness of a learned policy in selecting optimal quantization precision per frame while recognizing videos. Similar improvements (~2%-3%) were also observed on other datasets.

Effectiveness of Any-Precision Recognition Network

Three separate precision specific quantized models were used as part of the classifier and frames were routed to the corresponding models based on the policy to generate predictions. The exemplary embodiment of VideoIQ using separate models on the first dataset (with the second backbone) achieves a mAP of 74.9% (an improvement of only 0.1%) while requiring 34.0 GFLOPS and 115.6 MB of memory, in contrast to 28.1 GFLOPS and 50.2 MB of memory with a single any-precision network 512. Similarly, use of separate models on the third dataset yields only 0.1% improvement in mAP with 7.1% more computation and 56.5% of additional memory, compared to an any-precision network 512. This clearly shows the effectiveness of an exemplary embodiment of the any-precision network 512 over individual quantized models in obtaining very competitive performance with less computation and memory.

Video instance-aware quantization decides what precision should be used on a per frame basis for efficient video recognition. Specifically, a lightweight policy network 508 is utilized to predict these decisions and it is trained in parallel with an any-precision recognition network 512 with the goal of achieving both competitive accuracy and resource efficiency. Comprehensive experiments on four challenging and diverse datasets demonstrate the superiority of the exemplary embodiment of VideoIQ over existing state-of-the-art methods.

Given the discussion thus far, it will be appreciated that, in general terms, an exemplary method, according to an aspect of the invention, includes the operations of training a recognition network 512 for a selected video frame 704 at a desired highest precision using back-propagation; training a policy network 508 using back-propagation from the recognition network 512; training the trained recognition network 512 at a lower precision specified by a policy recommended for the selected video frame 704 by the trained policy network 508; inputting a frame 704 of a given video to the trained policy network 508 for determination of a precision policy for processing the frame 704; and performing video inferencing utilizing the trained policy network 508 and the trained recognition network 512 based on the precision policy. The skilled artisan will appreciate that a desired highest precision is in essence a first precision that is higher than the lower precision specified by the policy; 32-bit is a non-limiting example of a desired highest precision.

In one aspect, an apparatus comprises a memory and at least one processor, coupled to the memory, and operative to perform operations comprising training a recognition network 512 for a selected video frame 704 at a highest precision using back-propagation; training a policy network 508 using back-propagation from the recognition network 512; training the recognition network 512 at a precision specified by a policy recommended for the selected video frame 704 by the trained policy network 508; inputting a frame 704 of a given video to the policy network 508 for determination of a precision policy for processing the frame 704; and performing video inferencing utilizing the trained policy network 508 and the trained recognition network 512 based on the precision policy.

In one aspect, a computer program product comprises a computer readable storage medium having program instructions embodied therewith, the program instructions executable by a computer to cause the computer to perform operations comprising training a recognition network 512 for a selected video frame 704 at a highest precision using back-propagation; training a policy network 508 using back-propagation from the recognition network 512; training the recognition network 512 at a precision specified by a policy recommended for the selected video frame 704 by the trained policy network 508; inputting a frame 704 of a given video to the policy network 508 for determination of a precision policy for processing the frame 704; and performing video inferencing utilizing the trained policy network 508 and the trained recognition network 512 based on the precision policy.

It is noted that the selected video frame 704 in the preceding paragraph refers to a training video frame 704 and the given video refers to a video being classified by the recognition network 512; this is not necessarily true for every "selected video frame" mentioned herein as will be appreciated by the skilled artisan based on the context.

In one example embodiment, the policy network 508 is trained using standard back-propagation through Gumbel SoftMax sampling. In one example embodiment, the recognition network 512 is trained using standard back-propagation through Gumbel SoftMax sampling. In one example embodiment, video frames 704 corresponding to a precision policy of zero are skipped during the performance of the inferencing.

In one example embodiment, the policy network 508 is trained based on an overall loss $\mathcal{L}_g$, where the loss $\mathcal{L}_g$ is defined as:

$$\mathcal{L}_g(V) = \mathcal{L}_{ce}(V|A) + \mathcal{L}_{kd}(V|A) + w_1 \mathcal{L}_e(A) + w_2 \mathcal{L}_b(A) + w_3 \mathcal{L}_d(\pi),$$

where V is a given input video, A=g(V), π is a distribution, and $w_1$, $w_2$ and $w_3$ are hyperparameters to balance loss terms.

In one example embodiment, the recognition network 512 is trained based on an overall loss $\mathcal{L}_f$, where the loss $\mathcal{L}_f$ is defined as:

$$\mathcal{L}_f(V) = \Sigma_{A=b_1^T, \ldots b_n^T} \mathcal{L}_{ce}(V|A) + \mathcal{L}_{kd}(V|A),$$

where V is a given input video, A=g(V), b is a bit-width, T is a count of video frames, and n is a count of candidate bit-widths.

In one example embodiment, the training of the recognition network 512 at the precision specified by the policy further comprises quantizing a full precision weight W of the recognition network 512 to a largest bit-width $b_1$ and truncating a least significant $b_1-b$ bits to derive a quantized weight $\hat{W}_b$ and the method further comprising aligning $\mathbb{E}[\hat{W}_b]$ with $\mathbb{E}[\overline{W}_{b1}]$ to minimize a mean discrepancy caused by discarded bits.

In one example embodiment, the policy network 508 includes a feature extractor φ followed by a long short-term memory (LSTM) module:

$$h_i, o_i = \text{LSTM}(\phi(x_i), h_{i-1}, o_{i-1})$$

where $h_i$ and $o_i$ are hidden states and outputs, respectively, of the long short-term memory (LSTM) at a time step i.

Figure 16:
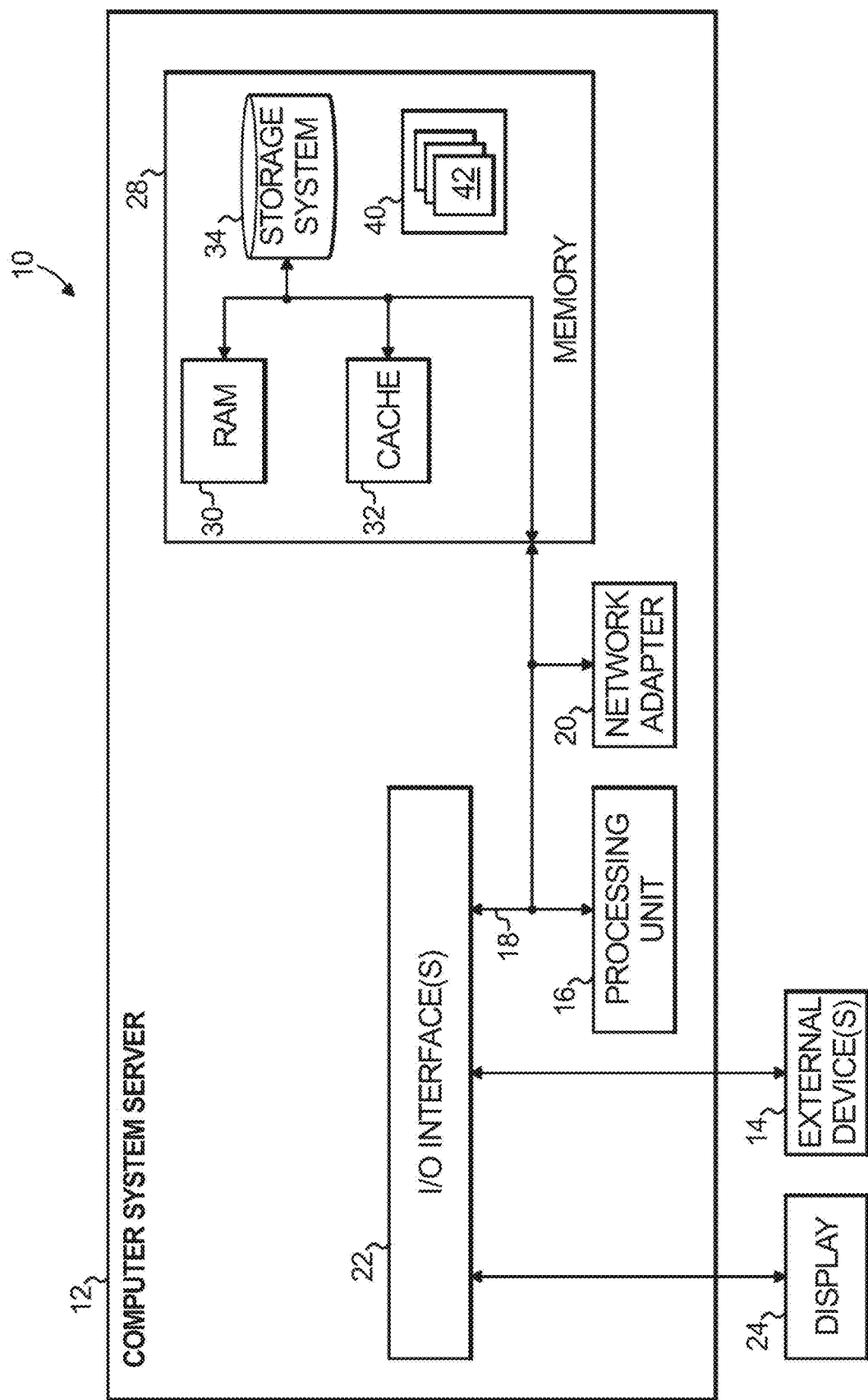
FIG. 16 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 16 depicts a computer system that may be useful in implementing one or more aspects and/or elements of the invention, also representative of a cloud computing node according to an embodiment of the present invention. Referring now to FIG. 16, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 16, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 16) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    training a recognition network for a selected video frame at a desired highest precision using back-propagation by selecting appropriate quantization levels of weights of the recognition network determined by a policy network trained using back-propagation from the trained recognition network;
    training the policy network using the back-propagation from the trained recognition network;
    training the recognition network at a lower precision specified by a policy recommended for the selected video frame by the trained policy network by selecting appropriate quantization levels of the weights of the recognition network;
    inputting a frame of a given video to the trained policy network for determination of a precision policy for processing the frame; and
    performing video inferencing utilizing a corresponding quantization level of the weights of the trained recognition network selected using the trained policy network.

2. The method of claim 1, wherein the policy network is trained using standard back-propagation through Gumbel SoftMax sampling.

3. The method of claim 1, wherein the recognition network is trained using standard back-propagation through Gumbel SoftMax sampling.

4. The method of claim 1, further comprising skipping video frames corresponding to a precision policy of zero during the performance of the inferencing.

5. The method of claim 1, wherein the policy network is trained based on an overall loss $\mathcal{L}_g$, where the loss $\mathcal{L}_g$ is defined as:

$$\mathcal{L}_g(V) = \mathcal{L}_{ce}(V|A) + \mathcal{L}_{kd}(V|A) + w_1 \mathcal{L}_e(A) + w_2 \mathcal{L}_b(A) + w_3 \mathcal{L}_d(\pi),$$

where V is a given input video, $A=g(V)$, $\pi$ is a distribution, and $w_1$, $w_2$ and $w_3$ are hyperparameters to balance loss terms.

6. The method of claim 1, wherein the recognition network is trained based on an overall loss $\mathcal{L}_f$, where the loss $\mathcal{L}_f$ is defined as:

$$\mathcal{L}_f(V) = \sum\nolimits_{A=b_1^T,\ldots b_n^T} \mathcal{L}_{ce}(V|A) + \mathcal{L}_{kd}(V|A),$$

where V is a given input video, $A=g(V)$, b is a bit-width, T is a count of video frames, and n is a count of candidate bit-widths.

7. The method of claim 1, wherein the training of the recognition network at the precision specified by the policy further comprises quantizing a full precision weight W of the recognition network to a largest bit-width $b_1$ and truncating a least significant $b_1$-b bits to derive a quantized weight $\hat{W}_b$ and the method further comprising aligning $E[\hat{W}_b]$ with $E[\hat{W}_{b1}]$ to minimize a mean discrepancy caused by discarded bits.

8. An apparatus comprising:
a memory; and
at least one processor, coupled to said memory, and operative to perform operations comprising:
training a recognition network for a selected video frame at a highest precision using back-propagation by selecting appropriate quantization levels of weights of the recognition network determined by a policy network trained using back-propagation from the trained recognition network;
training the policy network using the back-propagation from the recognition network;
training the recognition network at a precision specified by a policy recommended for the selected video frame by the trained policy network by selecting appropriate quantization levels of the weights of the recognition network;
inputting a frame of a given video to the policy network for determination of a precision policy for processing the frame; and
performing video inferencing utilizing a corresponding quantization level of the weights of the trained recognition network selected using the trained policy network.

9. The apparatus of claim 8, wherein the policy network is trained using standard back-propagation through Gumbel SoftMax sampling.

10. The apparatus of claim 8, wherein the recognition network is trained using standard back-propagation through Gumbel SoftMax sampling.

11. The apparatus of claim 8, the operations further comprising skipping video frames corresponding to a precision policy of zero during the performance of the inferencing.

12. The apparatus of claim 8, wherein the policy network is trained based on an overall loss $\mathcal{L}_g$, where the loss $\mathcal{L}_g$ is defined as:

$$\mathcal{L}_g(V) = \mathcal{L}_{ce}(V|A) + \mathcal{L}_{kd}(V|A) + w_1 \mathcal{L}_e(A) + w_2 \mathcal{L}_b(A) + w_3 \mathcal{L}_d(\pi),$$

where V is a given input video, $A=g(V)$, $\pi$ is a distribution, and $w_1$, $w_2$ and $w_3$ are hyperparameters to balance loss terms.

13. The apparatus of claim 8, wherein the recognition network is trained based on an overall loss $\mathcal{L}_f$, where the loss $\mathcal{L}_f$ is defined as:

$$\mathcal{L}_f(V) = \sum\nolimits_{A=b_1^T,\ldots b_n^T} \mathcal{L}_{ce}(V|A) + \mathcal{L}_{kd}(V|A),$$

where V is a given input video, $A=g(V)$, b is a bit-width, T is a count of video frames, and n is a count of candidate bit-widths.

14. The apparatus of claim 8, wherein the training of the recognition network at the precision specified by the policy further comprises quantizing a full precision weight W of the recognition network to a largest bit-width $b_1$ and truncating a least significant $b_1$-b bits to derive a quantized weight $\hat{W}_b$ and the operations further comprising aligning $E[\hat{W}_b]$ with $E[\hat{W}_{b1}]$ to minimize a mean discrepancy caused by discarded bits.

15. The apparatus of claim 8, wherein the policy network includes a feature extractor $\phi$ followed by a long short-term memory (LSTM) module:

$$h_i, o_i = \text{LSTM}(\phi(x_i), h_{i-1}, o_{i-1})$$

where $h_i$ and $o_i$ are hidden states and outputs, respectively, of the long short-term memory (LSTM) at a time step i.

16. A non-transitory computer program product, the non-transitory computer program product comprising a computer readable storage medium having program instructions embodied therewith, the program instructions executable by a computer to cause the computer to perform operations comprising:
training a recognition network for a selected video frame at a highest precision using back-propagation by selecting appropriate quantization levels of weights of the recognition network determined by a policy network trained using back-propagation from the trained recognition network;
training the policy network using the back-propagation from the recognition network;
training the recognition network at a precision specified by a policy recommended for the selected video frame by the trained policy network by selecting appropriate quantization levels of the weights of the recognition network;
inputting a frame of a given video to the policy network for determination of a precision policy for processing the frame; and
performing video inferencing utilizing a corresponding quantization level of the weights of the trained recognition network selected using the trained policy network.

17. The non-transitory computer program product of claim 16, wherein the policy network and the recognition network are trained using standard back-propagation through Gumbel SoftMax sampling.

18. The non-transitory computer program product of claim 16, the operations further comprising skipping video frames corresponding to a precision policy of zero during the performance of the inferencing.

19. The non-transitory computer program product of claim 16, wherein the policy network is trained based on an overall loss $\mathcal{L}_g$, where the loss $\mathcal{L}_g$ is defined as:

$$\mathcal{L}_g(V) = \mathcal{L}_{ce}(V|A) + \mathcal{L}_{kd}(V|A) + w_1 \mathcal{L}_e(A) + w_2 \mathcal{L}_b(A) + w_3 \mathcal{L}_d(\pi),$$

where V is a given input video, $A=g(V)$, $\pi$ is a distribution, and $w_1$, $w_2$ and $w_3$ are hyperparameters to balance loss terms.

20. The non-transitory computer program product of claim 16, wherein the recognition network is trained based on an overall loss $\mathcal{L}_f$, where the loss $\mathcal{L}_f$ is defined as:

$$\mathcal{L}_f(V) = \sum\nolimits_{A=b_1^T,\ldots,b_n^T} \mathcal{L}_{ce}(V|A) + \mathcal{L}_{kd}(V|A),$$

where V is a given input video, $A=g(V)$, b is a bit-width, T is a count of video frames, and n is a count of candidate bit-widths.

\* \* \* \* \*